US012664541B2

(12) United States Patent (10) Patent No.: US 12,664,541 B2

Demarinis et al. (45) Date of Patent: *Jun. 23, 2026

(54) APPLICATION FRAMEWORK USING BLOCKCHAIN-BASED ASSET OWNERSHIP

(71) Applicant: Nasdaq, Inc., New York, NY (US)

(72) Inventors: Richard Demarinis, Morris Plains, NJ (US); Hedi Uustalu, Tallinn (ES); Thomas Fay, Succasunna, NJ (US); Dominick Paniscotti, Totowa, NJ (US); Triin Parvits, Talinn (ES); Rachana Rajkumar, New York, NY (US); Junning Tong, Jersey City, NJ (US)

(73) Assignee: Nasdaq, Inc., New York, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 18/604,763

(22) Filed: Mar. 14, 2024

(65) Prior Publication Data

US 2024/0249278 A1 Jul. 25, 2024

Related U.S. Application Data

(63) Continuation of application No. 17/854,586, filed on Jun. 30, 2022, now Pat. No. 11,941,613, which is a (Continued)

(51) Int. Cl.
G06Q 20/36 (2012.01)
G06Q 20/38 (2012.01)
G06Q 40/04 (2012.01)

(52) U.S. Cl.
CPC ..... *G06Q 20/3678* (2013.01); *G06Q 20/3829* (2013.01); *G06Q 40/04* (2013.01); *G06Q 2220/00* (2013.01)

(58) Field of Classification Search
CPC ... G06Q 20/00–425; G06Q 40/00–128; G06Q 2220/00–18
See application file for complete search history.

(56) References Cited

U.S. PATENT DOCUMENTS 11,941,613 B2 * 3/2024 Demarinis ......... G06Q 20/3678
2003/0094489 A1 5/2003 Wald
(Continued)

FOREIGN PATENT DOCUMENTS

WO WO 2011/161400 A1 12/2011
WO WO 2015/024129 A1 2/2015
(Continued)

OTHER PUBLICATIONS

International Search Report and Written Opinion in corresponding Application No. PCT/US2017/032155 mailed Jul. 21, 2017.
(Continued)

*Primary Examiner* — Chenyuh Kuo
(74) *Attorney, Agent, or Firm* — Nixon & Vanderhye P.C.

(57) ABSTRACT

Systems and methods are provided for recording ownership information in a distributed ledger (such as a blockchain), and for performing application processing utilizing the distributed ledger. An example server computer system is configured to: record on a blockchain ownership information of an asset; to configure, for each owner of the asset, a digital wallet associated with a private cryptographic key and at least one blockchain address; using a blockchain address from a digital wallet to access ownership information in the blockchain; perform application processing using the accessed ownership information; and record in the blockchain, updated ownership information or other information associated with the ownership information in accordance with the performed application processing.

20 Claims, 19 Drawing Sheets

Related U.S. Application Data continuation of application No. 15/592,803, filed on May 11, 2017, now Pat. No. 11,397,944.

(60) Provisional application No. 62/334,764, filed on May 11, 2016.

(56) References Cited

U.S. PATENT DOCUMENTS

| | | | | |
|---|---|---|---|---|
| 2005/0288996 | A1* | 12/2005 | Wallman | G06Q 40/00 705/12 |
| 2014/0344015 | A1 | 11/2014 | Puertolas-Montanes et al. | |
| 2015/0221024 | A1 | 8/2015 | Sirsi | |
| 2015/0262140 | A1 | 9/2015 | Armstrong | |
| 2015/0356555 | A1 | 12/2015 | Pennanen | |
| 2016/0027229 | A1 | 1/2016 | Spanos et al. | |
| 2017/0109735 | A1* | 4/2017 | Sheng | G06Q 20/3678 |
| 2017/0232300 | A1* | 8/2017 | Tran | G06F 1/163 434/247 |

FOREIGN PATENT DOCUMENTS

| | | |
|---|---|---|
| WO | WO 2017/011601 A1 | 1/2017 |
| WO | WO 2017/027484 A1 | 2/2017 |

OTHER PUBLICATIONS

Examination Report in corresponding Australian Patent Application No. 2017263465 dated Sep. 4, 2019, pp. 1-8.
International Preliminary Report mailed May 2, 2018 in related PCT Application No. PCT/US17/32155.
Ron White, How Computers Work, Oct. 2003, QUE (Year 2003).

* cited by examiner

300

502

| | 11520257 |
| | MEROK |
| | EE3100098328 |
| | 17700000 |
| | 1 |
| | 31.01.2016 23:59 |

| HolderName | IDCode | Residence | InvestorType | AccountType | Balance |
|---|---|---|---|---|---|
| AS ABC Company | 10068039 | Estonia | C | Ordinary Account | 1274268 |
| OÜ DEF Company | 10791480-310764 | Estonia | C | Pledge account/financial guarantee | 6 |
| | | | | | 205 |
| John Doe | 1832-4449032302 | Finland | I | Ordinary Account | 17000 |
| Jane Doe | 28 | Estonia | I | Ordinary Account | 1050 |
| Bank GHI S.A. Clients | B9248 | Luxembourg | C | Nominee account | 141954 |

| Security description | ISIN | Number of shares held through the intermediary bank | Vote ratio |
|---|---|---|---|
| MERKO A-share | EE3100001835 | 1 000 | 1 |
| MERKO B-share | EE3100001827 | 100 | 10 |
| Total | | 1 100 | n/a |

```
asset_definition = {
  "company": "Company Name",
  "agm_date": ...,
  "agenda_item": "Motion to approve new Board Member, Jane Smith",
  "options": [
    {
      "title": "Yes",
      "address": Address1
    },
    {
      "title": "No",
      "address": Address2
    }
  ],
  "deadline": "..."
}
```

Fig. 14

```
{
    "address": address1 // To Wallet of Shareholder 1
    "amount": 120
},
{
    "address": address2 // To Wallet of Shareholder 2
    "amount": 210
},
{
    "address": address1 // To Wallet of Shareholder 3
    "amount": 170
}
```

Fig. 15

List of Meeting Participants

AS Nasdaq Tallinn Annual General Meeting

| Nr. | Name of the Shareholder | ID code/ Registry Code of a Shareholder | Name of the Proxy/Legal Representative | ID code/Registry Code of a Proxy/Legal Representative | Number of votes |
|---|---|---|---|---|---|
| 1 | Company ABC | 11716173 | Jane Doe 3 | 47508253596 | 489 188 |
| 2 | Custodian DEF | 10145981 | John Doe 8 | 36007142369 | 40 050 |
| 3 | Jane Doe 2 | 48902132230 | | | 1 |
| 4 | John Doe 1 | 37005262496 | | | 51 900 |
| 5 | Jane Doe 1 | 49506092463 | John Doe 7 | 37506293200 | 602 378 |
| 6 | John Doe2 | 39201062369 | | | 56 986 |
| | | | | Total amount of represented votes | 1 240 503 |

Fig. 16

List of Shareholders Votes - Agenda item 1

AS MERKO Annual General Meeting

| Nr. | Name of the Shareholder | ID code/Registry Code of a Shareholder | Name of the Proxy/Legal Representative | ID code/Registry Code of a Proxy/Legal Representative | Number of votes | Voted for option 1 | Voted for option 2 | Voted for option 3 | Did not vote |
|---|---|---|---|---|---|---|---|---|---|
| 1 | Company ABC | 11716173 | Jane Doe 3 | 47508253596 | 489 188 | 489 188 | | | |
| 2 | Custodian DEF | 10145981 | John Doe 8 | 36007142369 | 100 000 | 15 000 | 5 000 | 80 000 | |
| 3 | Custodian GHI | 14902083 | Jane Doe 1 | 49510219087 | 75 000 | | 75 000 | | |
| 4 | Custodian JKL | 12458600 | John Doe 4 | 36509242576 | 40 050 | 10 050 | | | |
| 5 | | | John Doe 4 | 36509242576 | *10 050* | | | | |
| 6 | | | John Doe 5 | 12345678900 | *20 000* | | *20 000* | | |
| 7 | | | John Doe 6 | 45678901234 | *10 000* | *10 000* | | | |
| 8 | Jane Doe 2 | 48902132230 | | | 1 | | | | 1 |
| 9 | John Doe 1 | 37005262496 | | | 51 900 | | 51 900 | | |
| 10 | Jane Doe 1 | 49506092463 | John Doe 7 | 37506293200 | 602 378 | | | 602 378 | |
| 11 | John Doe 2 | 39201062369 | | | 56 986 | | | | 56 986 |
| | Total amount of represented votes | | | | 1 415 503 | 524 238 | 151 900 | 682 379 | 56 986 |

APPLICATION FRAMEWORK USING BLOCKCHAIN-BASED ASSET OWNERSHIP

CROSS REFERENCE(S) TO RELATED APPLICATION

This application is a continuation of U.S. application Ser. No. 17/854,586 filed Jun. 30, 2022, which is a continuation of U.S. application Ser. No. 15/592,803 filed May 11, 2017, now U.S. Pat. No. 11,397,944, issued on Jul. 26, 2022, which claims the benefit of priority of U.S. Provisional Application No. 62/334,764 filed May 11, 2016. The entire contents of the above listed applications are incorporated herein by reference.

TECHNICAL OVERVIEW

The technology described herein relates to distributed ledger technology (such as blockchain technology), proof of work systems, cryptosystems, and electronic transaction systems.

INTRODUCTION

Blockchain technology (sometimes simply referred to as blockchain) is a relatively new technology that has been used in digital currency implementations. It is described in a 2008 article by Satoshi Nakamoto, called "Bitcoin: A Peer-to-Peer Electronic Cash System," the entire contents of which are hereby incorporated by reference. The blockchain is a data structure that stores a list of transactions and can be thought of as a distributed electronic ledger that records transactions between source identifier(s) and destination identifier(s). The transactions are bundled into blocks and every block (except for the first block) refers back to or is linked to a prior block in the chain. Computer nodes maintain the blockchain and cryptographically validate each new block and thus the transactions contained in the corresponding block. This validation process includes solving a computationally difficult problem that is also easy to verify and is sometimes called a "proof-of-work."

The integrity (e.g., confidence that a previously recorded transaction has not been modified) of the entire blockchain is maintained because each block refers to or includes a cryptographic hash value of the prior block. Each block's hash is derived from the contents of that block. Accordingly, once a block refers to a prior block, it becomes difficult to modify or tamper with the data (e.g., the transactions) contained therein. This is because even a small modification to the data will affect the hash value of the entire block. Each block added to the chain increases the difficultly of tampering with the contents of an earlier block. Thus, even though the contents of a blockchain may be available for all to see, they become practically immutable.

The identifiers used for blockchain transactions are created through cryptography such as, for example, public key cryptography. For example, a user may create a destination identifier based on a private key. The relationship between the private key and the destination identifier can later be used to provide "proof" that the user is associated with the output from that created transaction. In other words, the user can now create another transaction to "spend" the contents of the prior transaction. Further, as the relationship between the destination identifier and the corresponding private key is only known by the user the user has some amount of anonymity as they can create many different destination identifiers (which are only linked through the private key).

Accordingly, a user's total association with multiple transactions included in the blockchain may be hidden from other users. While the details of a transaction may be publically available on the distributed ledger, the underlying participants to those transactions may be hidden because the identifiers are linked to private keys known only to the corresponding participants.

While distributed ledger technologies such as blockchain show great potential, further improvements in the performance, efficiency, and capabilities of such technologies are needed.

SUMMARY

In an example embodiment, a server computer system is communicatively coupled to one or more client computers and to a distributed blockchain computer system that includes multiple computing nodes, each computing node storing a copy, or a portion thereof, of a blockchain of the distributed blockchain computer system. The server computer system is configured to: record on the blockchain, by transmitting one or more electronic messages to the distributed blockchain computer system, ownership information of respective groups of one or more units of an asset for each of a plurality of owners of the asset; and to configure, for each of one or more of the plurality of owners, a digital wallet corresponding to one of said groups of one or more units of the asset, the digital wallet being associated with a private cryptographic key and at least one blockchain address generated based upon the private cryptographic key. The server computer system is further configured to: responsive to a command received from a client computer, use a blockchain address stored in one of the wallets to access ownership information of the asset recorded in the blockchain; and perform application processing using the accessed ownership information.

In example embodiments, the server computer system may be adapted for shareholder voting. In such embodiments, the application processing includes an operation to enable the owners or proxies of the owners of the groups of one or more units of the asset to vote according to a number of units of the asset during a meeting. The server computer system may further be configured to perform actions that include: distributing at least one voting token to a digital wallet of each of the plurality of owners or their proxies; starting a voting event; during the voting event, providing for transmitting to the distributed blockchain computer system respective ones of the voting tokens in the digital wallets of one or more of the owners to any of a plurality of blockchain addresses; ending the voting event; and after the ending, determining, based upon numbers of the voting tokens recorded in the blockchain for each of the plurality of blockchain addresses, a distribution of votes for each of a plurality of voting choices.

This Summary introduces a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 5 shows an example shareholding list that can be used to record securities ownership in an immutable ledger, in accordance with some example embodiments;

FIG. 7 shows an example of a vote allocations per share according to some example embodiments;

FIG. 13 shows an example asset definition for an agenda item for voting, according to some example embodiments;

FIG. 14 shows an example distribution of voting tokens, according to some example embodiments;

FIG. 15 shows an example report of meeting participants, according to some example embodiments;

FIG. 16 shows an example report of voting on an agenda item, according to some example embodiments.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In some example embodiments, information regarding the ownership of particular assets (e.g., shares in a company, etc.) are stored in a blockchain, and various data processing operations (referred to below as "application processing") are performed using this ownership information. As will be described in further detail below, because such ownership information is stored in a blockchain, which is immutable and which allows for the electronic verification of the data stored therein, such operations can be performed with greater performance, efficiency, and reliability than in other types of computing systems. While a number of examples will be provided herein wherein the assets are equity securities (e.g., stock or shares of a corporation), the technology described herein may mutatis mutandis be used with many other types of assets, including but not limited to debt securities (e.g., banknotes, bonds and debentures), and derivatives (e.g., forwards, futures, options and swaps), other financial instruments, or other assets such as real property or goods.

Figure 1:
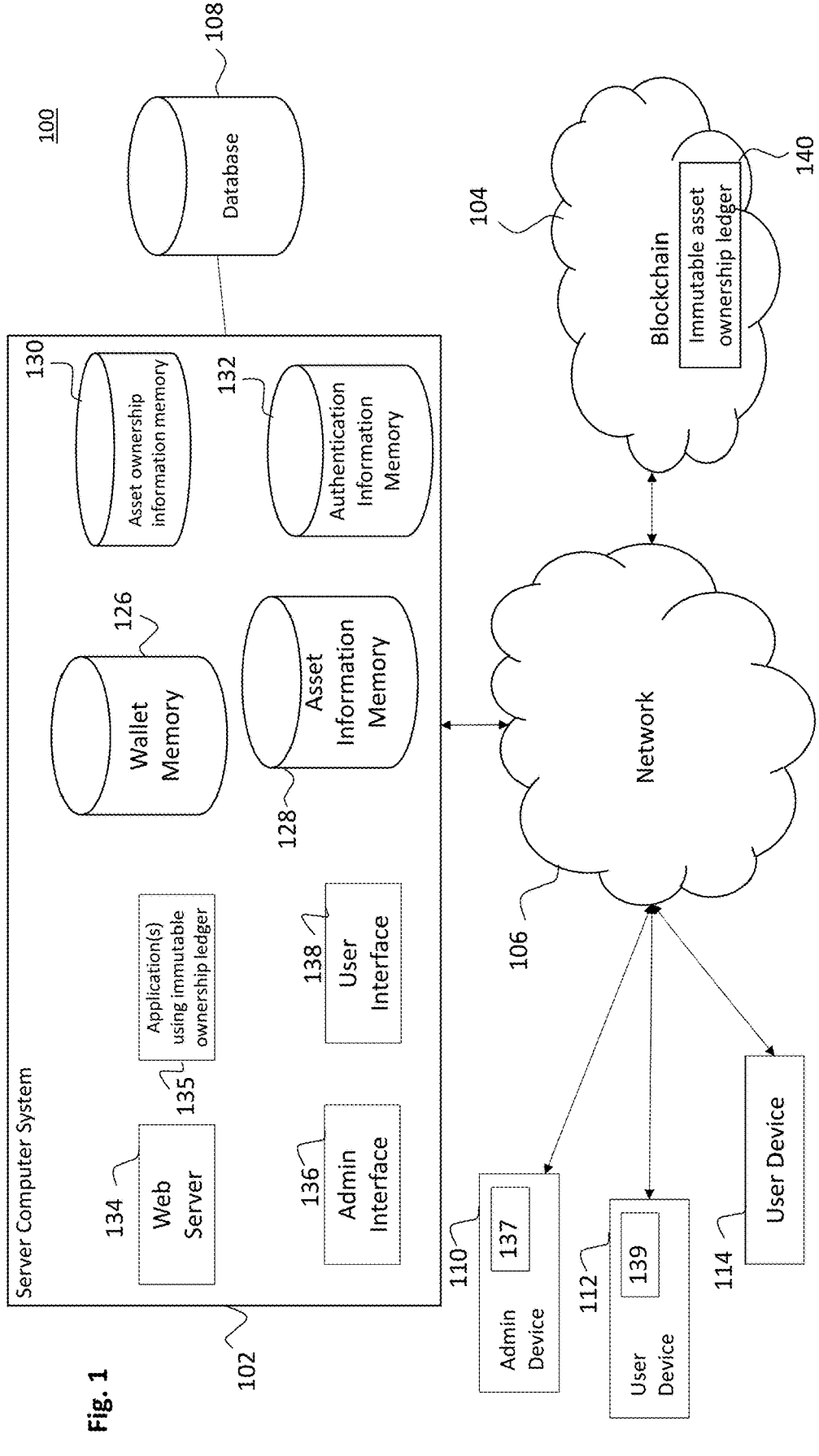
FIG. 1 shows a block diagram of a networked computer environment for recording asset ownership in an immutable manner using a blockchain and for providing services utilizing the immutably recorded ownership of assets, according to some example embodiments.
Figure 2:
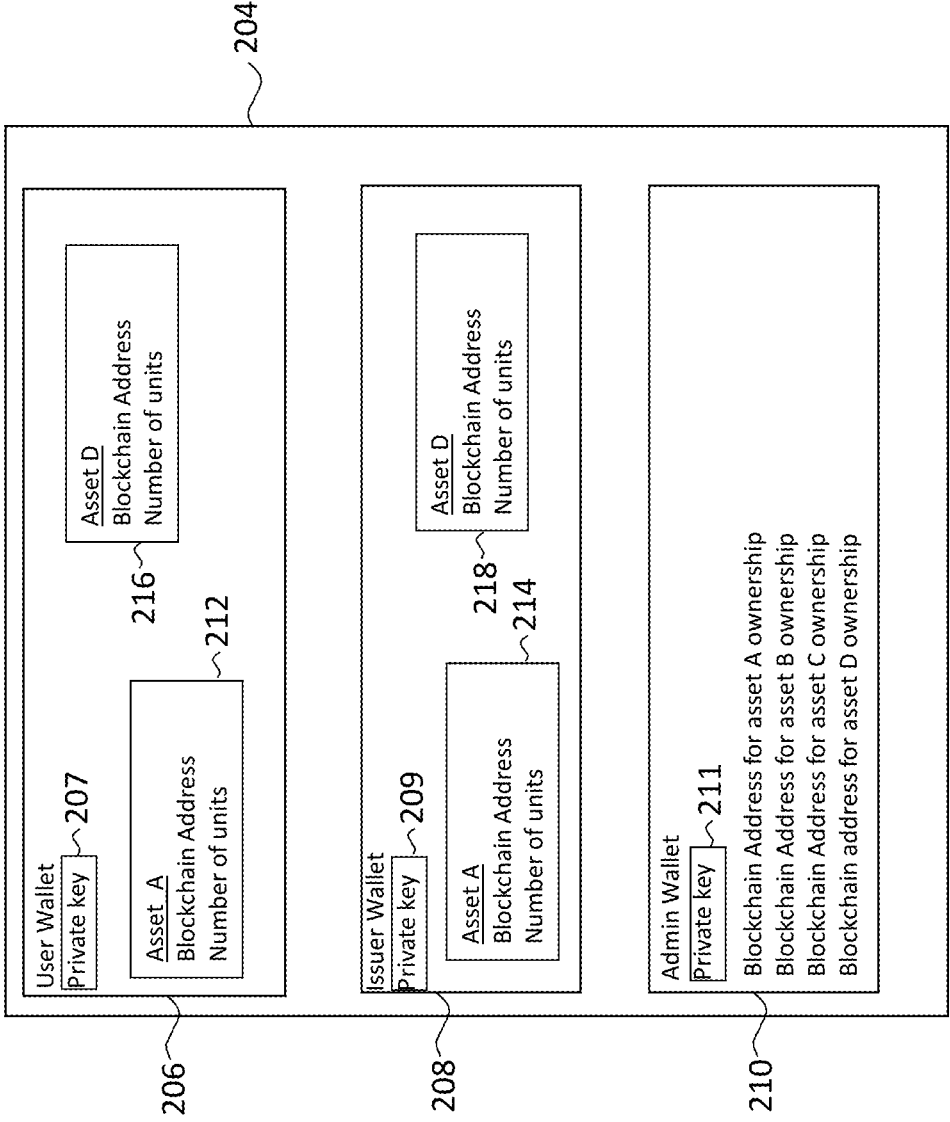
FIG. 2 shows an example digital wallet memory storing private keys and addresses for interacting with the immutable ledger such as that which is part of the system environment shown in FIG. 1, according to some example embodiments.
Figure 3:
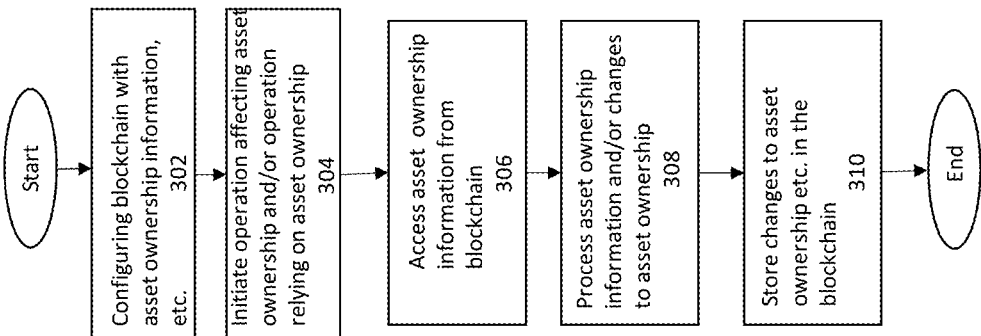
FIG. 3 is a flowchart of a process for recording and using asset ownership in a system such as that shown in FIG. 1, according to some example embodiments.

FIG. 1 below illustrates a networked computer environment and server computer system for recording a distributed immutable ledger of asset ownership information in a blockchain system, and for application processing utilizing the immutable ledger. FIGS. 2 and 3 illustrate an example digital wallet memory and a process, respectively, for interacting with the blockchain system in the networked computer environment shown in FIG. 1.

Figure 4:
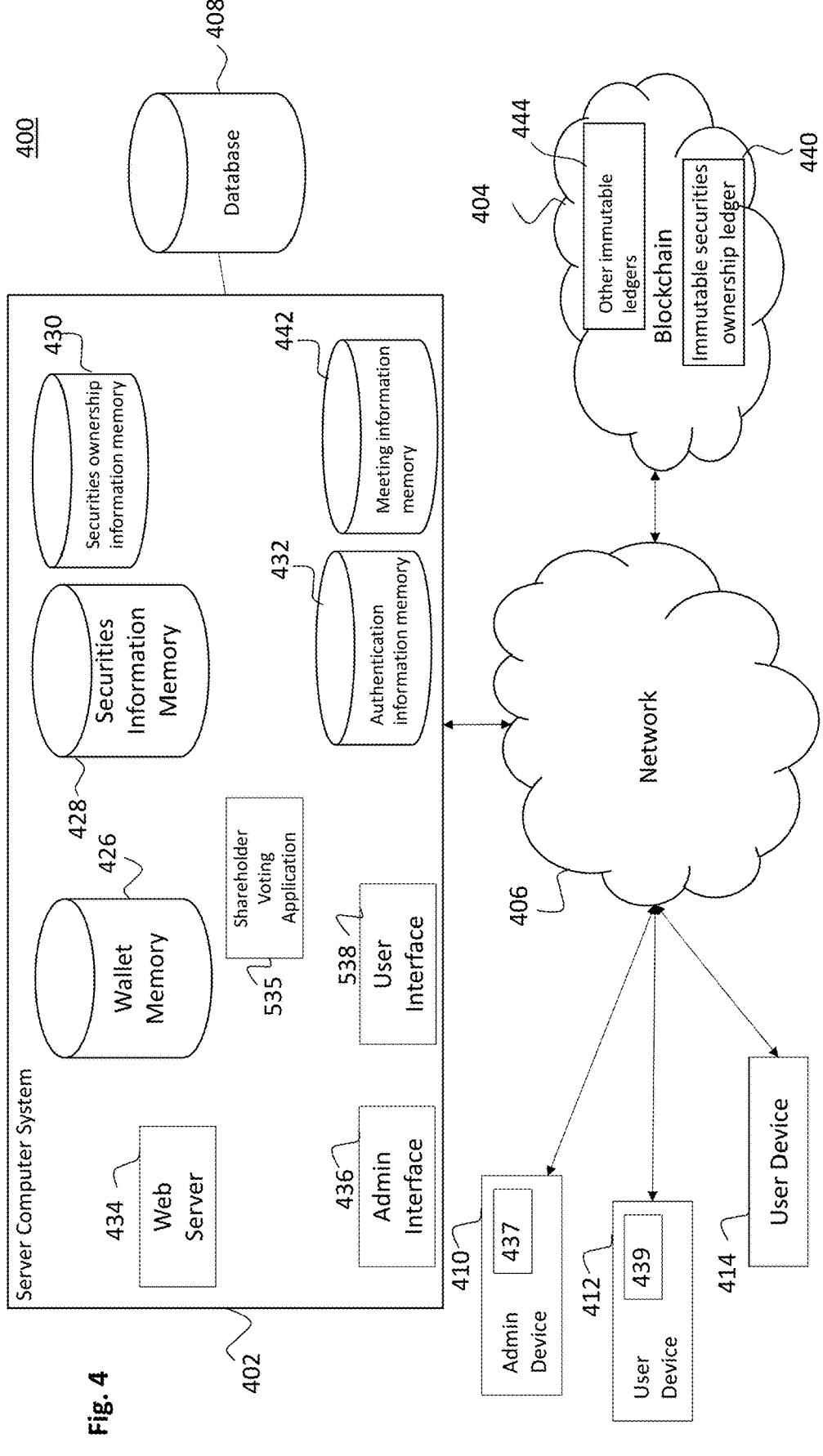
FIG. 4 shows an example computer system for recording securities ownership in an immutable ledger and using it in a computer-implemented shareholder voting application, and an associated network environment, according to some example embodiments.

FIG. 4 illustrates the networked computer environment of FIG. 1 adapted for a shareholder voting application using a blockchain system which records shareholding ownership in an immutable ledger. The shareholding ownership information may be initially obtained and/or recorded in a list such as that shown in FIG. 5. FIGS. 6-16 relate to the adapted networked computer environment shown in FIG. 4.

Figure 17:
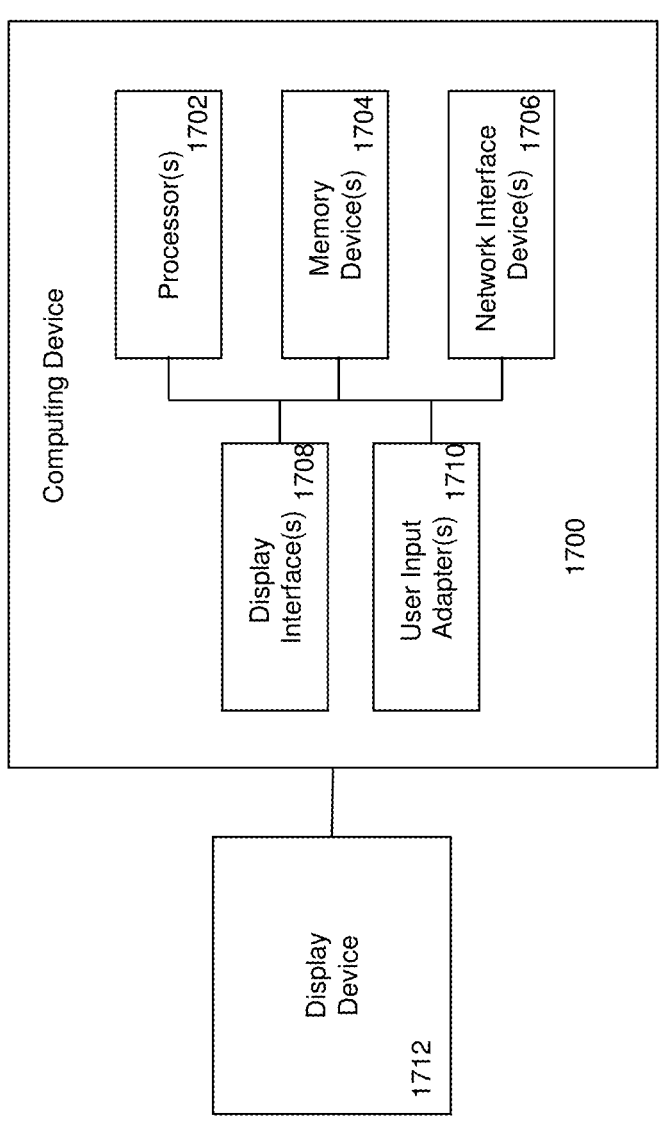
FIG. 17 shows an example-computing device that may be used in some embodiments to implement features described herein.

FIG. 17 illustrates an example hardware configuration that may be used for implementing one or more of the components shown in and/or described with reference to FIGS. 1-16.

FIG. 1

FIG. 1 shows a block diagram of a networked computer environment 100 for recording asset ownership in a distributed immutable manner using one or more blockchains and for performing applications utilizing the immutably recorded ownership of assets, according to some example embodiments. Networked computer environment 100 includes a blockchain system 104 for storing one or more immutable ledgers related to one or more asset types, a server computer system 102 for performing operations utilizing the one or more immutable ledgers, and user devices (e.g., user devices 110-114) for accessing services provided by the server computer system 102. The blockchain system 104, server computer system 102 and user devices 110-114 are interconnected by a network 106. The networked computer environment 100 may also include one or more databases 108 providing access to various data and/or processing by third party systems. Databases 108 may be connected to server computer system 102 directly or indirectly through network 106.

Server computer system 102 includes wallet memory 126 and, optionally, one or more other storage memories including asset information memory 128, asset ownership information memory 130 and authentication information memory 132. In some embodiments, server computer system 102 may include a plurality of computers, such as that described, for example, in relation to FIG. 17, connected by a network.

Blockchain system 104 includes a plurality of processors for processing commands and one or more memories storing information in one or more blockchain data structures. The blockchain system 104 may be publically accessible system (e.g., a distributed decentralized computing system) or may be privately run by a third party entity or the same entity that is running the server computer system 102. Blockchain system 104 maintains one or more blockchains of continuously growing lists of data blocks, where each data block refers to previous blocks on its list. As noted above, the requirement for each block to refer to all previous blocks in the blockchain, yields a chain of blocks that is hardened against tampering and revision, such that the information stored in the blockchain is immutable. That is, the work required to successfully tamper with or change data in even one block on the blockchain while still maintaining the validity of the blockchain would impose a cost in computing power and time so prohibitively high, that it is not practically possible for even an administrator of the blockchain system 104 to successfully tamper with or change transaction data already in the blockchain.

Transactions represent the content to be stored in the blockchain. Blocks of transactions record and confirm when and in what sequence transactions enter and are logged in the blockchain. The blocks are created from transactions by one or more administrator nodes or, in some embodiments, nodes known as "miners" in the blockchain system which use specialized software and/or hardware designed specifically to create blocks. Once a new block is generated that includes a submitted transaction that transaction becomes a part of the blockchain. The blockchain is then distributed to the various computing nodes that make up the blockchain system. The Bitcoin blockchain is an example blockchain system that can be used in some embodiments. The Bitcoin blockchain uses bitcoins as the unit of exchange in transactions, and the Colored Coin protocol, or the like, can be used to encode asset transactions in accordance with some embodiments. Other blockchain implementations that can be used in embodiments, such as, for example, Chain or Etherium, do not use bitcoins as the unit of exchange in transactions, and can natively encode asset information in the transactions. In blockchain implementations that do not use bitcoin as the unit of transaction, a protocol such as Colored Coin can be used to associate metadata with the asset information natively encoded in the transaction.

Server computer system 102 may include, or may connect over a network to, database 108. Database 108 may include one database or multiple databases at one or more locations, and may store account information, audit information, mappings between blockchain transactions and colored coins (e.g., as a means of encoding metadata defining aspects of assets to be recorded in the blockchain) and other data. In some embodiments, database 108 may include one or more external databases or data services. For example, database 108 may include a data service provided by an entity different from the entity controlling the server computer system 102, such as, but not limited to, external data services providing asset information (e.g., securities information), asset ownership information (e.g., share ownership information), user authentication information, etc.

Admin device 110, user device 112 and user device 114 are used to access the services of the server computer system 102. Devices 110-114 (also referred to as client devices) may be a networked computing device such as a smart phone, tablet, laptop computer, desktop computer or other computing device.

Wallet memory 126 and/or other storage memories 128-132 may include data structures or other logical structures used to store associated data on one or more common or dedicate electronic data storage (e.g., RAM, FLASH memory, or a hard-drive). In certain example embodiments, dedicated hardware devices, such as a hardware security module (HSM), may be used to store information associated with wallet memory 126 or other storage memories 128-132. In certain example embodiments, wallet memory may be stored on a dedicated storage hardware externally provided and in communication with computer system 102. Wallet memory 126 stores a "digital wallet" for each of one or more entities who have at least temporary ownership of an asset stored on the blockchain, in order for that entity to access the server computer system 102 and the blockchain system 104. A digital wallet enables the "owner" of that wallet to interact with the blockchain system 104. The "owner" of a digital wallet may be an administrative user for server computer system 102, an administrative user for an entity, or an end-user of an application utilizing the blockchain system. For example, wallet memory 126 may include a digital wallet for a user of one of user device 112 or user device 114, by which that user can record information (i.e., by submitting a transaction) to the blockchain, for example, to an immutable ledger of records of asset ownership 140, cause processing using information accessed from the blockchain, and enable other participants in the system to send transactions to that user. In some embodiments, one or more of the user devices, such as user devices 112 and 114, may store at least a part of the digital wallet for that user. Further description of digital wallets in wallet memory 126 can be found below in relation to FIG. 2.

Asset information memory 128 stores information regarding assets related to operations performed by computer system 102 while utilizing blockchain system 104. For example, asset information memory 128 may store the name of each asset (e.g., shares of particular type), issuer information, total issued number of the asset, etc. for which ownership is recorded in the blockchain.

Asset ownership information memory 130 includes asset ownership information. For example, for plural assets stored in 128, asset ownership information memory 130 stores ownership information. In some embodiments, asset ownership information memory 130 may include a copy of asset ownership information recorded in the blockchain.

Authentication information memory 132 stores information for authenticating the users of the system. The users of the system may be owners of assets recorded in memories 128 and/or 130, proxies for asset owners, etc.

Applications 135 may be executed by processors of the computer system 102 and includes logic instructions for implementing one or more applications (e.g., asset ownership affecting actions and/or operations relying upon asset ownership, corporate securities-related applications such as shareholder voting, stock split, stock repurchase, etc.) by controlling the computer system 102 and its components, access to database 108, interactions with blockchain system 104, interactions with devices 110-114, and client portions 137 and 139 of interfaces. The logic instructions for applications 135 may be stored on a non-volatile memory and may be in volatile memory in its entirety or in parts during execution of the application by a processor of the computer system 102.

Web server 134 may include one or more web servers and/or other servers, such as, but not limited to, application servers, load balancing servers, etc., and operates to receive inputs from operators including administrators and users of the server computer system 102. Web server 134, in response to inputs received from an operator or in response to internally-generated signals, performs or causes the server computer system 102 to perform operations for maintaining records of asset ownership in an immutable manner using a blockchain, and/or for providing services utilizing immutable records of asset ownership in a blockchain.

The administration interface 136 is a web-based interface which enables an administrator or other operator to access information stored on the blockchain and/or to store information on the blockchain. The administration interface 136 may include a client-based part 137 (e.g., a web interface or native app) which executes on the access device (e.g., admin device 110) being used by an administrator or other operator, and a server part which may be performed by the web server 134. Client interface 137 may provide a web-based or app-based graphical user interface (GUI) for creating and managing accounts, creating and managing shareholder meetings, administering voting rounds, recording proxies, voting rights transfers etc.

The user interface 138 is a web-based interface which enables a user to access information stored on the blockchain and/or to store information on the blockchain. The user interface 138 may include a client-based part 139 (e.g., a web interface or native app) which executes on the access device being used by a user (e.g., user devices 112 or 114), and a server part which may be performed by the web server 134. Client interface 139 may provide a web-based or app-based GUI for registering with the server computer system, register for meetings, participate in voting, display agenda items and/or voting results, etc. HTTP, JSON and/or other web-based communication protocols may be used for communications between web server 134 and client-based parts 137 and 139.

In many places in this document, including but not limited to in the above description of FIG. 1, software modules and actions performed by software modules are described. This is done for ease of description; it should be understood that, whenever it is described in this document that a software module performs any action, the action is in actuality performed by underlying hardware elements (such as a processor and a memory device) according to the instructions that comprise the software module. Further details regarding this are provided below in, among other places, the description of FIG. 17.

FIG. 2

FIG. 2 shows an example wallet memory 204 storing private keys and blockchain addresses for interacting with the blockchain system 104 in the networked computer environment shown in FIG. 1, according to some example embodiments.

Each digital wallet in wallet memory 126 may be implemented in various embodiments as a combination of hardware and software, or as specific-purpose hardware. A digital wallet enables an entity (e.g., an end-user, a representative of an end-user, a representative of a corporation or other legal entity, etc.) to interact with blockchain system 104. As noted above, a digital wallet includes a private key (e.g., a cryptographic encryption/decryption key that is known to the holder of the wallet) and one or more blockchain addresses as identifiers that have been generated using the private key. These identifiers are used to allow participants (i.e., admin and other users) to "send" transactions associated with a particular asset, which are recorded on the blockchain, to that identifier. Software associated with the digital wallet may then be used to query the blockchain to determine a current status of the asset based upon the information recorded on the blockchain. For example, when ownership information for a particular type of asset is stored on the blockchain, the software may be used to retrieve and output to the user, the current ownership information list associated with that type of shares, and the history of transactions associated with the asset. Information such as the number of assets of a particular type that an owner of a digital wallet owns etc., may be determined by software from the blockchain and may be stored in association with the corresponding digital wallets.

In certain example embodiments, a digital wallet and/or its contents (e.g., private key and generated identifiers) are stored on a user-controlled device (e.g., user device 111 or 112) and the user devices transmit the identifiers and/or private key to the computer system 102 for use thereby.

In yet other embodiments, the private key of a participant may be stored on computer system 102 in encrypted form, and when required for interaction with the system be provided to the participant's device which decrypts (e.g., using an RSA card reader) the private key and uses the decrypted private key in the interaction with the system.

In certain example embodiments the entity running the computer system 102 may include its own digital wallet (not shown in FIG. 2) that includes a private key and blockchain addresses that allow participants (e.g., users of the blockchain) to send payments as transaction fees for use of the blockchain. For example, in some embodiments, when recording a change to a shareholding list stored in a blockchain of blockchain system 104 or when retrieving the shareholding list from the blockchain, computer system 102 may submit that transaction along with a transaction to send a payment to the operator of blockchain system 104.

The example wallet memory 204 shown in FIG. 2 may be a wallet memory such as wallet memory 126 shown in FIG. 1. For example, the wallet memory 204 may be configured in one or more memories. The wallet memory 204 includes digital wallets such as user wallet 206, issuer wallet 208, and admin wallet 210.

A different private key (e.g., 207, 209 and 211) is recorded in, or is recorded in association with, each digital wallet. As described above, the private key is used in generating the transactions relating to each digital wallet, recorded in the blockchain (e.g., blockchain in blockchain system 104).

User wallet 206 includes information regarding two assets: asset A and asset D. A blockchain address and, optionally, a number of units of the asset are recorded for each of asset A (see memory area 212) and asset D (see memory area 216) in user wallet 206. The number of units information can be determined from the blockchain, and, in some embodiments, may be stored in, or in association with, the corresponding digital wallet (e.g., in order to reduce the need to access the blockchain for obtaining frequently used information).

Issuer wallet 208 too includes information regarding two assets: asset A and asset D, with a blockchain address and, optionally, a number of units of the asset are recorded for each of asset A (see memory area 214) and asset D (see memory area 218) in issuer wallet 208.

Admin wallet 210 includes blockchain addresses associated with each asset ownership recorded in the blockchain. For example, the blockchain address in admin wallet 210 for asset A is used in example embodiments to access the asset A ownership information and to record an update to asset A ownership.

By way of example, the number of units of the asset indicated in the issuer wallet for asset A may have initially been recorded in the blockchain by a transaction as the total number of units of that asset. Subsequent transactions may assign units of the asset to each owner of asset A according to ownership specified in an ownership ledger in the blockchain. For example, each such subsequent transaction can add a number of units of the asset to an asset owner's digital wallet according to the ownership specified in the the ownership ledger, and deduct that number of units of the asset from the issuer's digital wallet.

FIG. 3

FIG. 3 is a flowchart of a process 300 for recording and using asset ownership in a system such as that shown in FIG. 1, according to some example embodiments. Process 300 may be used for performing operations (e.g., asset ownership affecting operations and/or operations relying upon asset ownership, corporate operations such as stock splits, stock buybacks, etc.) involving securities by utilizing a blockchain (e.g., blockchain in blockchain system 104) for immutably recording ownership information for the securities.

After entering process 300, at operation 302, the blockchain is configured with asset ownership information. This operation includes recording the ownership of one or more types of assets. Each type of asset is represented in the blockchain as an asset. An asset is owned by the issuer (e.g., corporation) who issues it, or another entity who has acquired it from the issuer or from another entity which owned the asset. In some embodiments, the ownership information for each type of asset can be obtained from a central registry (e.g., a registry controlled by a government or regulatory entity) and then reliably recorded in the blockchain.

According to an embodiment, the asset ownership information obtained from a central registry is recorded in the blockchain. The recording may be performed by submitting one or more transactions to the blockchain at, for example, one or more blockchain addresses available from the admin wallet. The submitted transaction causes the blockchain to create one or more new blocks containing the ownership recording transactions (typically along with other transactions) and to store the new block in the blockchain. Server computer system 102 may perform any level of validation to ensure that the information obtained from the central registry and initially recorded in the blockchain is accurate. Transactions submitted by participants, including in this case the server computer system 102 represented by the admin wallet 310, are validated and are eventually written to the blockchain.

Each participant is registered with the server computing system 102. A user can be a person, a corporation, or other entity that is assigned an account for electronically interacting with the computer system. A participant account may include a legally valid identification, blockchain account information, participant name and address, public and private keys (e.g. Elliptic Curve key pair), etc. As part of the registration process, the participant is assigned or otherwise provided with a digital wallet that is used to perform operations using the asset ownership recorded in the blockchain. In some embodiments, an Elliptic Curve public/ private key pair is generated and the digital wallet is initialized using the public key, and the wallet id (e.g., the wallet's blockchain address) may be stored in the participant's account as the blockchain id. Voting rights, votes etc. are assigned to the digital wallets of the respective participants or of the representatives of the participants.

In certain example embodiments, the transactions on the blockchain are in turn associated with so-called "coloredcoins." Color coins add additional data on top of a traditional blockchain asset (e.g., such as a bitcoin which is the unit of transaction on the Bitcoin blockchain) and are used to identify some tradable asset. Tradable assets can include securities, real property or other types of tradable goods. In example embodiments, for example, colored coins are used to identify and store the actual asset ownership information, while a hash of the actual ownership information is stored on the blockchain. This helps reduce the size of the blockchain in a manner conducive to the distributed nature of blockchain implementations. However, it should be understood that certain embodiments can use custom-defined assets for each tradable asset on the blockchains, thus avoiding an additional layer such as "colored coins" which is often used on blockchains specifically designed for transferring money.

Subsequently, at operation 304, one or more operations utilizing one or more assets for which information from a blockchain is used is initiated. Example, initiated operations may include asset ownership affecting operations and/or operations relying upon asset ownership records. Other example initiated operations may include corporate securities-related operations such as, but not limited to, a shareholder vote, a stock split, reverse stock split, share buyback, etc.

Each of the above example asset ownership-related operations can advantageously use the underlying blockchain system to store asset ownership information and to provide highly reliable asset ownership information. Relying upon blockchain-recorded ownership information enables applications for corporate operations, such as those noted above, to completely rely upon the ownership information it receives from the blockchain system and may diminish or eliminate the necessity for relying on a secondary technique for assuring reliability of the ownership information.

At operation 306, asset ownership information recorded in the blockchain is accessed. A software program may provide an interface for querying the blockchain and presenting a unified view of what transaction outputs (e.g., transactions that have not been used as an input to another subsequent transaction) are "owned" by the holder of the digital wallet. In other words, the digital wallet may determine all of the transactions on the blockchain that are associated with the stored identifiers and the stored private key that are contained in the digital wallet. By way of example, when accessing the blockchain using the software program to determine current share ownership of a particular security, the admin wallet may be used to query the shareholding list for that security. In response to the querying, the software program resolves transactions involving the shareholding list for that security to immutably define the current shareholding.

At operation 308, the ownership information obtained from the blockchain is made use of during processing. For example, the ownership information can be used to determine the distribution of votes in accordance with the asset ownership determined using the ownership information obtained from the blockchain. In another embodiment, the ownership information obtained from the blockchain is used to determine an asset buyback.

At operation 310, the change of asset ownership, if any, is recorded in the blockchain. In the first example discussed above in relation to operation 308, no change takes place for the asset ownership, and therefore the ownership is not updated. In the second example discussed above, the asset buyback affects ownership levels. Therefore, new ownership levels are written to the blockchain as a transaction. For example, a new asset ownership information with updated ownership amounts can be recorded on the blockchain. As described above, the submitted transactions are periodically "mined" by participating computers in the blockchain to add new blocks to the blockchain.

As noted above, the blockchain system 104 may include multiple different computer nodes that each operate to "mine" and thereby validate transactions submitted to the blockchain. Generally, only one of the nodes needs to "receive" a transaction that has been submitted from a client. Once one node receives a transaction it may propagate the transaction to other nodes within the blockchain system 104. In some blockchain implementations a selected one or more nodes, rather than an arbitrary number of "mining" nodes, perform the block generation based on a hash of all the previous blocks in the chain.

Hashes (also referred to herein as "hash functions," "cryptographic hash functions," and the like) include functions that map an initial input data set to an output data set. The output from a hash function may be referred to herein as a "hash identifier," "hash value," "hash data set," or simply, a "hash"). Generally, the output values from a given hash function have the same fixed length. Generally, if the same hash function is used on the same input data it will result in the same output data value. With some hash functions (including those used in the context of blockchain techniques and/or the subject matter of this application) the input value is computationally difficult to determine when only the output value is known. In certain examples, the input value for the hash function is supplemented with some additional random data. For example, an input value of "blockchain" for a hash function may include addition random data such as three random characters. Accordingly, the data value that is hashed may be "blockchaina5h" instead of simply "blockchain." The additional random data is sometimes called a "nonce."

In order to validate a new block into the blockchain, the hash operation process that is performed may include finding an input hash value (i.e., the block) that results in an output hash value that meets a given condition. As the data related to the blockchain transactions in the block are fixed, nodes on the blockchain modify the nonce value that is included as part of the block being validated until the output value of the hash function meets the given condition. For example, a target output value may have 5 zeros as the first four numbers of the hash. This is a problem that may be computationally difficult to determine, yet relatively easy to verify. Each node that is part of the blockchain may also keep a copy or a portion of the blockchain in storage (e.g., on disk or in RAM) that is local to the corresponding node.

After the recording of the changed ownership, process 300 ends.

FIG. 4

FIG. 4 shows a networked computer environment 400 including an example server computer system 402 for a computer-implemented shareholder voting application that uses an immutable distributed digital ledger for securities ownership records and other information associated with securities ownership such as, but not limited to, vote-related records, according to some example embodiments. In some embodiments, the server computer system 402 provides a secure web-based shareholder voting application 435 on blockchain technology. Application 435 may be executed and/or controlled by a shareholder voting administrator (e.g., Nasdaq) for use by companies, custodians, investors and proxies for voting in shareholder meetings. The security, flexibility and the immutability of the application 435 may remove most if not all barriers from remote and even cross-border voting in shareholders meetings. Growing cross-border investments and pressure for greater investor engagement call for a secure, cost-effective and flexible technological solution that enables participation and voting from a distance, with requisite reliability and security. Embodiments provide a strong technological solution for supporting investors in exercising the rights arising from the ownership of securities in a secure, efficient and cost-effective way and enables such features as proxy voting, tracing a vote in an immutable ledger, etc.

The networked computing environment 400 including server computer system 402 and blockchain system 404 correspond to networked environment 100, server computer system 102 and blockchain system 104, respectively, with the networked computing environment 400 being adapted for shareholder voting using the blockchain system. The asset information recorded on the blockchain system 404 includes securities ownership information such as that described in more detail below including in relation to FIG. 5. The ownership information may be obtained from an external location or data service and/or may be accessed through or stored in database 408. Other asset information that may be recorded on the blockchain system 404 includes securities ownership related information such as voting rights and proxy assignments. Server computer system 402, blockchain system 404, network 406, database 408, admin device 410, user devices 412-414, wallet memory 426, securities information memory 428, securities ownership information memory 430, authentication information memory 432, web server 434, admin interface 436-437, and user interface 438-439, each may operate in a similar manner to corresponding components server computer system 102, blockchain 104, network 106, database 108, admin device 110, user devices 112-114, wallet memory 126, asset information memory 128, asset ownership information memory 130, authentication information memory 132, web server 134, admin interface 136-137, respectively. Some of the components or parts thereof may have been adapted specifically for shareholder voting. In particular, server computer system 402 includes, in addition to components note above, a shareholder voting application 435 and a meeting information memory 442 in server computer system 402. Moreover, blockchain system 404 may include one or more other immutable distributed ledgers 444 in addition to a securities ownership ledger 440.

Shareholder voting application 435 may be executed by one or more processors of the server computer system 402 and includes logic instructions for implementing shareholder voting by controlling the server computer system 402 and its components, access to database 408, interactions with blockchain system 404, interactions with devices 410-414, and client portions 437 and 439 of interfaces. The logic instructions of shareholder voting application 435 may be stored in a non-volatile memory, and may be in volatile memory in its entirety or in parts during execution by a processor of the server computer system 402.

Meeting information memory 442 stores information about meetings (e.g., information necessary for administering votes during meetings). Meeting information may include, for each meeting, the issuer of the securities (e.g., shares, bonds, options, etc.) related to the meeting, date and time of meeting, and a list of agenda items. One or more agenda items may include a vote. The meeting information may also allow configuration, for each agenda item in which a vote is to be taken, available options for voting.

Other immutable ledgers 444 includes one or more ledgers used, for example, for recording voting rights (e.g., voting rights tokens) and ballots (e.g., vote tokens or voting tokens) associated with each vote. Although different types of data maintained in the blockchain system are referred to herein as being in separate blockchains, the underlying implementation of the blockchain system may maintain all or groups of such data, even if they are different types of data, on one blockchain. Indeed, in some embodiments, blockchain system 404 may control only a single blockchain.

The admin device 410 may be operated by an administrator of the server computer system 402. For example, Nasdaq may be an administrator. User devices 412-414 may be operated by any other participant in the the server computer system 402. An investor (e.g., an owner of securities), a custodian (e.g. a nominee account holder who is legally entitled to exercise the rights arising from securities in the nominee account and is liable for performance of the obligations arising from such securities), an account operator (e.g. a legal entity who is an official cooperation partner of a registry such as registry 932), and a proxy (e.g., an entity to whom an investor has transferred voting rights for exercise on behalf of the investor), are some example types of other participants that may operate devices 410-414.
FIG. 5

FIG. 5 shows an example shareholding list 502 having ownership information used to record share ownership in an immutable ledger implemented on a blockchain such as in blockchain system 404, according to some example embodiments. The shareholding list 502 for a particular type of shares (e.g., shares of company X) may be obtained by computer system 402 in a CSV file format, and includes a timestamped list of all shareholders who owned any number of the particular share type at the time represented by the timestamp.

The example shareholding list 502 includes a plurality of shareholding records for a particular type of shares, each shareholding record indicating a name of the shareholder, an identification code for the shareholder, residence information of the shareholder, investor type for the shareholder, and the number of shares owned by the shareholder (e.g., AS ABC Co has a ID of 1006, a listed residence of Estonia, is of type C, is an ordinary account, and holds or owns 1274268 shares).

The example shareholding list 502 also includes header information, or information common to the plurality of shareholder records. The common information includes a timestamp indicating when the shareholder ownership information was acquired. The timestamp may include one or both of the date and the time at which the shareholding information was acquired. Thus, the timestamp can be relied upon as indicating an instant in time in which a snapshot of the shareholding information was acquired. The common information also includes a vote ratio defining how many votes are allocated per share, and the total number of shares. Other common information may include the identifying information for the security.

In the example shown in FIG. 5, a vote ratio of 1 vote per share is indicated. However, the number of votes per share may be configurable. In some embodiments, the vote ratio may be set to different values for two or more types of securities in the same shareholding list based upon one or more of security type, investor type, and/or account type.

The ownership information from the list 502 is recorded on the blockchain. In some embodiments, an ownership record on the blockchain is created for each shareholder for each particular share type owned by that shareholder. The information for all shareholders for the particular share type can be recorded on the blockchain in a single transaction. In some embodiments, the ownership information may be recorded in separate transactions for each shareholder or group of shareholders, and the timestamp from the list 502 may be associated with each record.

Selected fields from the list 502 may be stored in each ownership record. For example, in some embodiments, shareholder name and/or account number, type of shareholder account, share id code, and the number of shares may be recorded. The timestamp representing the time when the list 502 was obtained from the registry, or other known time when the ownership information is determined to be valid, may be associated with or included in each ownership record. One or more other fields, and/or different fields may be stored in the ownership records in some embodiments.

In another embodiment, the ownership information may be recorded by recording the list 502 or other list of all owners for each share type. For example, the shareholding list 502 may be recorded in the blockchain as a CSV or like file.

After the ownership information is recorded on the blockchain, the immutability of the blockchain yields sufficient reliability to the shareholding information, so that operations utilizing the shareholding information can be performed without relying on another means of confirming the validity of the shareholding information.
FIG. 6

Figure 6A:
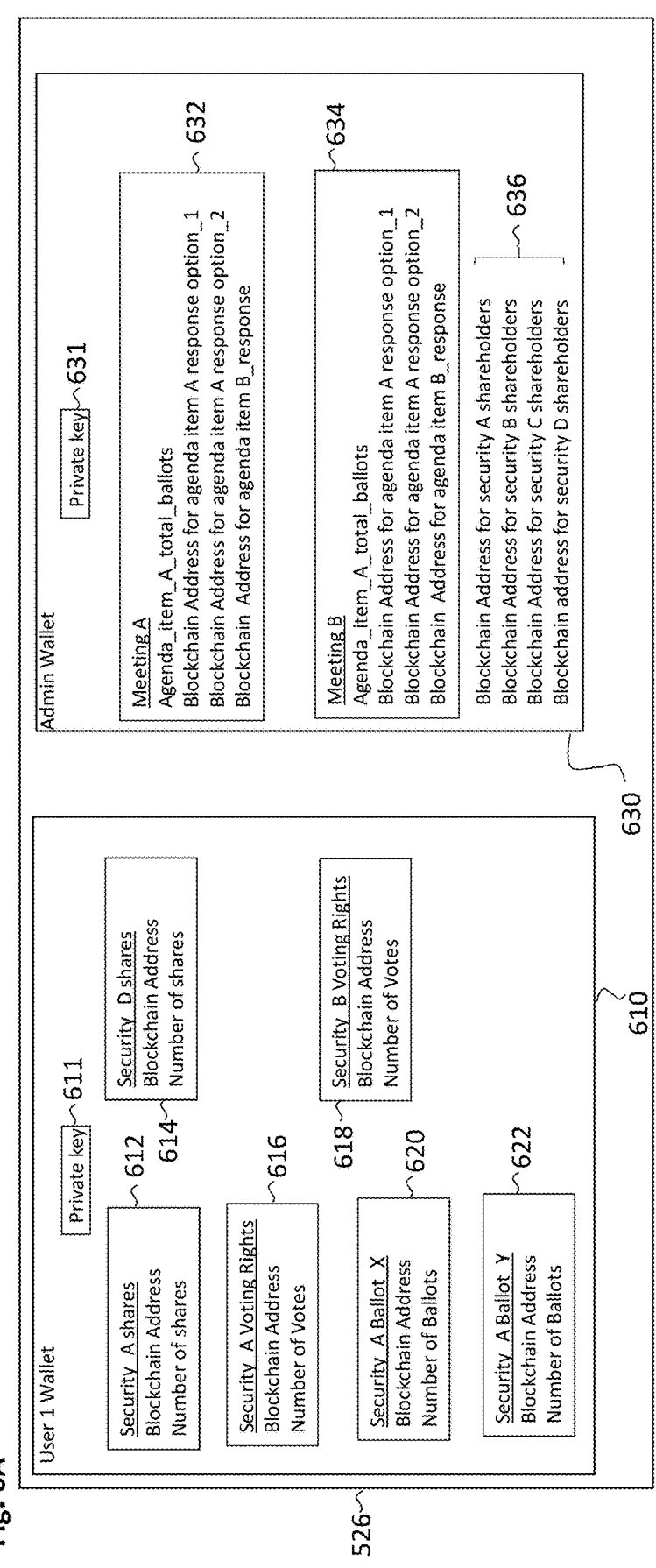
FIG. 6 (FIGS. 6a and 6b) illustrate examples of digital wallet memory for use in a system environment such as that shown in FIG. 4, according to some example embodiments.
Figure 6B:
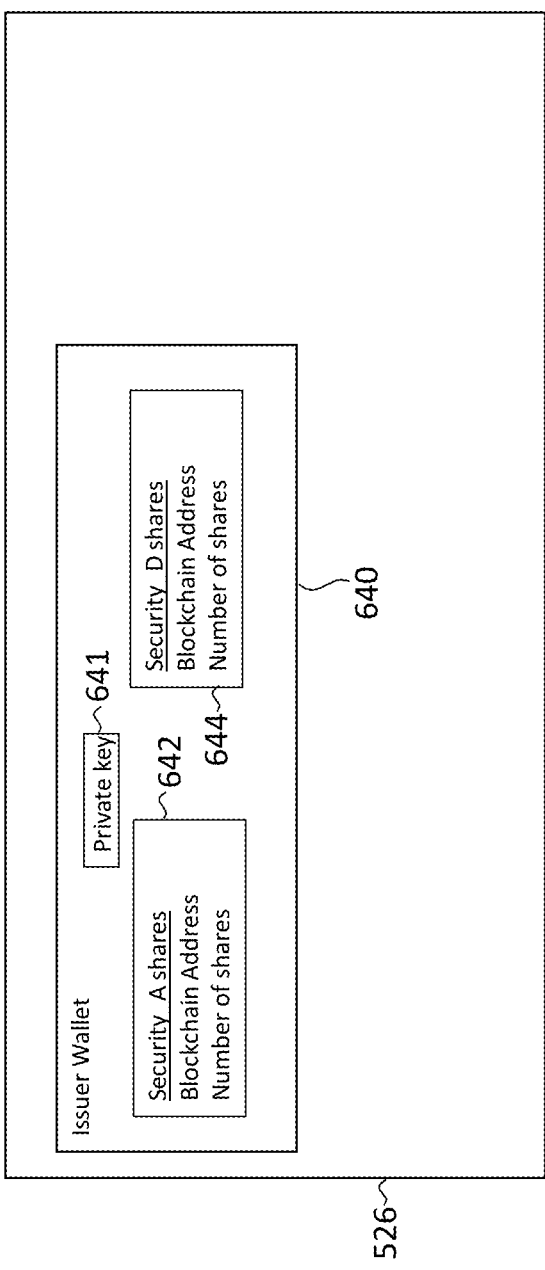

FIG. 6 (FIGS. 6A and 6B) illustrates an example wallet (such as, for example, wallet memory 426) memory in a networked computing environment such as that shown in FIG. 4, according to some example embodiments. User wallet 610 has information for security A and security B shares, issuer wallet 640 has information for security A and security B shares, and admin wallet 630 has information for shareholding ownership.

The information for security A 612 in the user wallet 610 for a particular shareholder includes a blockchain address for the shareholder's ownership record for security A. Other information, such as the number of shares of security A owned by the shareholder may also be included in the digital wallet. As described in relation to FIG. 2, even if certain ownership information can be readily determined from the blockchain, it may be advantageous to store some such information in the memory associated with a corresponding digital wallet. For example, by determining and storing the number of shares of a particular share type owned by a shareholder, the computer system may avoid having to access the blockchain each time such frequently required information is required. Similar information is included in the user wallet for security D 614. Each user wallet 610 also includes a private key 611.

The issuer wallet 640 also may include blockchain address and other information for security A 642 and security D 644. In some embodiments, the blockchain addresses in the issuer wallet and the number of shares information represent shares of a particular type owned by the issuer. Each issuer wallet 640 also includes a private key 641.

In some embodiments, wallet memory 426 may also include an admin wallet 630 including one or more private keys 631. The blockchain address 636 for a particular type of share in the admin wallet represents a shareholding ownership list for that share type recorded in the blockchain. Some embodiments however may not have an admin wallet and/or blockchain addresses 636 stored in an admin wallet. For example, in such embodiments, the shareholders for any particular type of share (e.g., security A) may be determined by iterating through all the user wallets to determine which of the user wallets include information for that particular share type.

In addition, digital wallets 610, 630 and 640 also include information for a shareholder voting application (e.g., such as application 425) implemented using the immutable record of asset ownership on blockchain system 404.

For example, user wallet 610 includes voting rights token information 616 for security A and voting rights token information 618 for security B. Voting rights token information 616 and 618 each include a blockchain address to which corresponding voting rights transactions are addressed to, and the number of voting rights tokens of the particular security assigned to the owner of the digital wallet. A valid voting rights token for security A is required in order to cast a vote on an agenda item.

User wallet 610 also includes vote token X 620 and vote token Y 622 areas for security A, representing voting tokens to be used for agenda items X and Y respectively. Vote token 620 and 622 each also include a blockchain address to which vote transactions are addressed, and the number of vote tokens.

The number of votes for which a shareholder is entitled to may be determined based upon a shareholder's number of shares and a specified vote ratio. A vote ratio specifies how many votes are to be allocated per security (e.g., per share), and may be configured per type of security, per group of securities or for all securities of an issuer.

Admin wallet 630 also includes data elements 632 and 634 for meeting A and meeting B, respectively. Data elements 632 for meeting A includes, for example, a total number of voting tokens for an agenda item A, and respective blockchain addresses for receiving voting token transactions for responses corresponding to agenda items.

Note that in the embodiment illustrated in FIG. 6, the issuer wallet 640 does not contain information specific to voting rights tokens or voting tokens. However, in some embodiments, when the issuer operates as the meeting administrator, for example, voting information and ballot information that are shown in FIG. 6 as being in the admin wallet may be included in the issuer wallet.

FIG. 7

FIG. 7 shows an example of vote allocations per share according to some example embodiments. Table 702 may be stored, for example, in meeting information memory 442. Table 702 represents the number of shares with voting rights and the vote ratio associated with each of two types of shares of a particular issuer. Votes relating to the two types of shares may be obtained in the same meeting or different meetings, and may be administered over a blockchain-based system shown in FIG. 4.

FIG. 8

Figure 8:
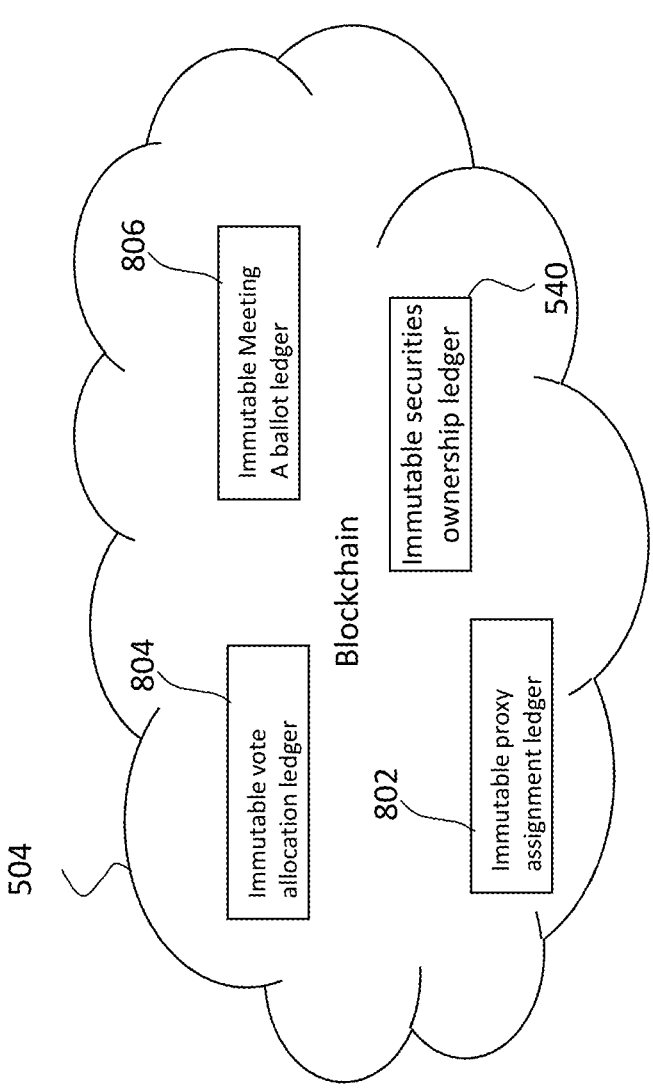
FIG. 8 shows some types of information that can be recorded in one or more immutable ledgers in the networked computer environment of FIG. 1, according to some example embodiments.

FIG. 8 shows different types of information recorded in blockchain system 404, according to some example embodiments. As illustrated blockchain system 404 ledgers 802, 804 and 806 for several other types of recorded items, in addition to the shareholder ownership ledger 440. Immutable proxy assignment ledger 802 records proxy assignments associated with shareholders. Immutable vote allocation ledger 804 records number of vote allocations to shareholders. Immutable voting token ledger 806 records voting token allocations for a particular meeting.

A person of skill in the art would appreciate that the information of 440 and 802-806 can be included in one blockchain or in two or more blockchains. In some embodiments, each of 440, 802, 804 and 806 may represent a respective blockchain.

FIG. 9

Figure 9:
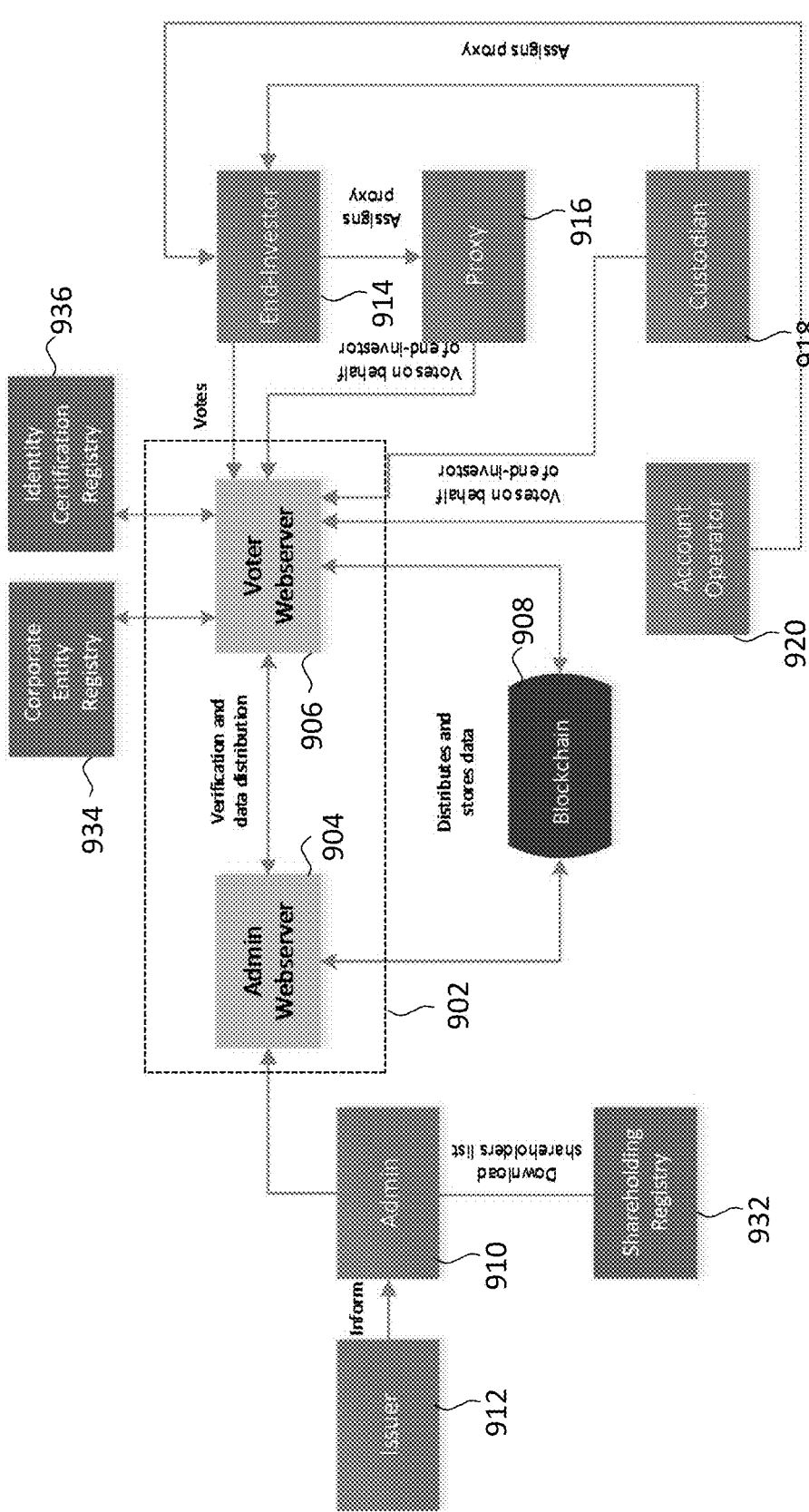
FIG. 9 shows interactions among some components associated with a system environment shown in FIG. 4, according to some example embodiments.

FIG. 9 shows interactions among some components associated with the networked environment shown in FIG. 4, according to some example embodiments. Server computer system 902, which may correspond to server computer system 402 shown in FIG. 4, includes admin webserver 904 and voter webserver 906.

Admin webserver 904 receives inputs from admin user 910. Admin user 910 may interact with the admin webserver 904 in order to upload shareholding lists from an external official shareholder registry 932. In an example embodiment, the registry 932 may be controlled by a government or regulatory authority and may require that every shareholder have an active securities account in the registry. The shareholding lists, such as that shown in FIG. 5 for example, may be directly uploaded to server computer system 902 from registry 932, or may be uploaded through admin 910. In case of the latter option, suitable encryption and/or other secure techniques are employed in order to assure the integrity of the shareholding list obtained from the official registry 932. The shareholding list, timestamped to indicate its validity as of the time it was obtained from registry 932, is recorded in blockchain system 908 by admin webserver 904 and/or other components of server computer system 902.

Issuer 912 may notify admin 910 that it wishes to use the registration and voting services of the server computer system 902 at, for example, a general meeting. Issuer 912 may interact with admin 910 to cause admin 910 to initiate the uploading of the shareholding list. Issuer 912 may also, either through admin 910 or directly through admin webserver 904, configure server computer system 902 for shareholder voting in one or more meetings. The information specified per meeting may include a meeting identifier, which may be specified by a user or generated by the system, date and time of meeting, and type of meeting (annual general meeting, extraordinary general meeting, bondholder meeting, other). Additionally, a start time and end time for activating voting may be specified.

Configuring the server computer system 902 for a meeting may include, for example, specifying a date and time for the meeting, and configuring information regarding any votes to be taken at the meeting. One or more agenda items are also specified per meeting. An agenda item number, a question or proposal, and each valid option for a response, may all be specified per agenda item. The admin webserver 904 and other components of the server computer system 902, may configure digital wallets of shareholders with a number of votes in accordance with their shareholding as determined by the shareholding list recorded in the blockchain system 908.

In some example embodiments, upon receiving a request for a meeting for shareholders of one or more types of securities from issuer 912, admin 910 or other component of server computer system 902 may notify all shareholders, custodians and/or proxies who are known to the computer system 902 at the time as holding a position in any one of the one or more types of securities about the meeting. Notification may also be provided to any other entity specified by configuration.

Admin 910 may also create accounts for the various users of server computer system 902. When creating an account for a new issuer, a name, registry code, address information, contact information etc. may be specified. Additionally, securities type details such as ISIN (International Securities Identification Number) code, name of the security, number of securities, vote ratio or number of votes, etc. may be specified per security type.

Indirect shareholders can register their digital wallets (e.g., voting accounts) if they are identified by a custodian who is already registered with the server computer system 902 or if they are identified via an external identifying service (e.g., identity certification registry 936) which interfaces with the server computer system 902. Direct shareholders can register their digital wallets without the intermediation of a custodian. Voting tokens are transferred to digital wallets by admin based on the input received from shareholders list. Custodians as nominee account owners are responsible for proxy assignment, i.e. transferring the correct number of voting tokens to an end shareholder's digital wallet. Account operators who act as proxies to vote on behalf of the shareholders of shares held on custodian nominee accounts can register the account via admin, who may approve the registration based on submitted power of attorney (e.g., a recorded contract authorizing the transfer of voting rights for one or more meetings and/or defined time period from a holder of the right to another). The Voter webserver 906 is configured to receive inputs from end-investors 914, proxies 916, custodians 918, and account operators 920. The inputs may include casting votes for one or more ballot issues presented during a meeting conducted in accordance with the configuration provided by admin 910 and/or issuer 912.

Voter webserver 906, admin webserver 904 and/or other component of server computer system 902, may be configured to control voting such that after ballots (e.g., voting tokens) are assigned to shareholders etc., modifying of agenda items is prevented while allowing for adding new agenda items during the meeting.

Server computer system 902 enables shareholders to be assigned proxies for purposes of voting on behalf of the shareholder. A proxy may be assigned by transferring voting rights tokens from the shareholder to the proxy. The transfer of the voting rights tokens may represent a transfer of power of attorney from the shareholder to the proxy. In some embodiments, a power of attorney document, for example, a legal document and/or information regarding such a legal document, may be recorded in the blockchain. Server computer system 902 also provides for the shareholders to rescind power of attorney. Rescinding functionality may be disabled at the end of the meeting. Each proxy may be delegable. A shareholder can, upon request, view all assigned proxies and trace the path of a proxy (e.g., in case it was delegated). The assignment of a proxy, in some embodiments, can be for a specific meeting and/or for a specific period.

Upon login of any users 914-920 for casting votes, the voter webserver 906 may validate the login with an external identity certification center 936. For example, in some embodiments, users 914-920 may login using a government (or regulatory authority) provided identification and the voter webserver can in real time access a certification center 936 to determine the validity of the provided login information. In some embodiments, for increased security, the server computer system 902 may require that a participant provides its private key (e.g., encrypted with the government provided id) when requesting login. A government provided identity number and/or mobile number may be used for these purposes. Additionally, the voter webserver 906 may provide an account only to those entities that have an active securities account with the registry 932. Providing an account may include creating a digital wallet and generating a private key to be used for accessing the digital wallet, voting, assigning proxies and digitally signing those two aforementioned transactions.

In case of recurring login, server computer system 902 may enable identifying at least some users by the user's private key. For example, a key supplied in response to a request for login credentials can be compared to a private key stored in a digital wallet assigned to a specified user identifier. Shareholders and representatives of a legal entity can also be identified by private key, but before final access, a representation right is preferably verified via a registry 934. In case a user has lost his private key, a new private key can be generated in the voter webserver if sufficient secondary identification for the user is available.

An investor (e.g., end-investor, end-beneficiary of a share) 914 may vote his shares himself or may assign the power to vote to a proxy 916, who may then vote on behalf of the end user via voter webserver 906. Voter webserver (or admin webserver or other component of server computer system 902) may have previously recorded the proxy assignment in the blockchain, and at the time of login, the proxy's authorization to vote the shares of the end investor may be verified by querying the blockchain.

A custodian 918 may hold shares on behalf of one or more shareholders. The custodian 918 may himself vote the shares for each of the shareholders for whom he is custodian, or may assign a proxy to an end-investor to vote his shares.

Account operator 920 may access voter webserver 906 as an intermediary for one or more investors for whom it has a proxy. In some embodiments, a second registry 934 may be accessed to determine representation rights of shareholders that are legal entities. For example, a registry or data service 934 can be queried to determine a representative of a corporate entity.

FIG. 10

Figure 10:
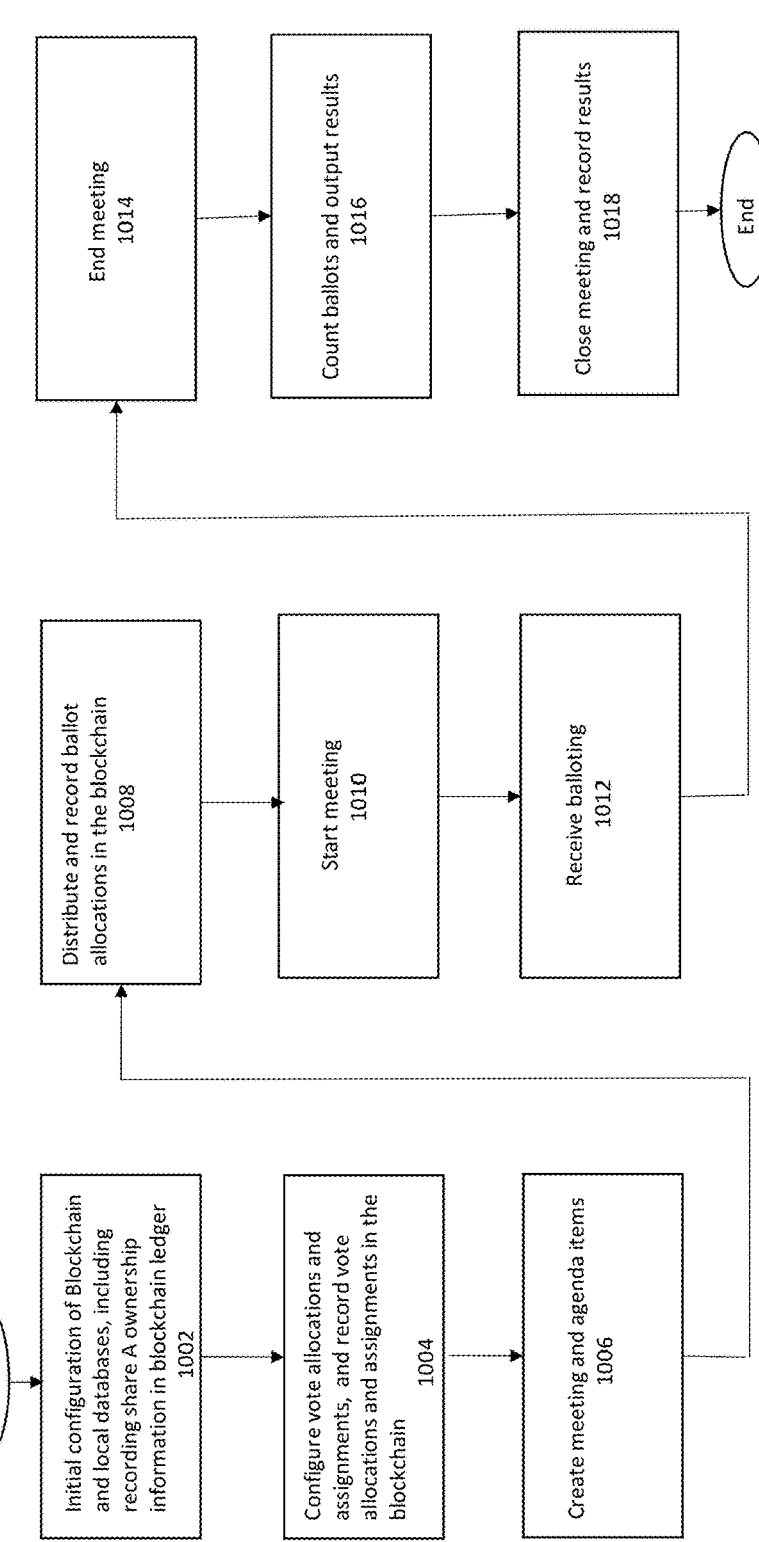
FIG. 10 illustrates a flowchart of a process for a computer-implemented voting system utilizing share ownership information recorded in an immutable ledger, according to some example embodiments.

FIG. 10 illustrates a flowchart of a process 1000 for a computer-implemented voting system utilizing share ownership information recorded in an immutable distributed ledger in a blockchain. Process 1000 may be performed by server computer system 402 shown in FIG. 4, at least in part, by the execution of shareholder voting application 435.

After entering process 1000, at operation 1002, initial configuration of the blockchain and local databases is performed. Initial configuration may include recording the shareholding list (e.g., shareholding list similar to that shown in FIG. 5) for one or more securities in the blockchain (e.g., of blockchain system 404) and creating and/or registering participant accounts. In some embodiments, a participant is registered as a shareholder if predetermined conditions are met, such as, participant being identified as a shareholder from the shareholding list or a representation right (e.g., indirect shareholders) being verified, and/or the participant owning an active securities account in a share ownership registry such as registry 932.

Internal databases, such as, for example, one or more of databases 426-432 shown in FIG. 4 may be configured. Digital wallets may be created in wallet memory 426 for each shareholder as represented in the shareholding list recorded in the blockchain. Securities information memory 428 may be populated with the name, type and number of shares information regarding the security for which shareholding lists were recorded in the blockchain. The securities ownership information memory 430 may store a copy of the shareholding list, and authentication information memory 432 may obtain authentication information for each of the shareholders from an external entity.

The databases and/or the blockchain may also be configured with any proxy assignments etc., for shareholders. Proxy assignments are described in further detail in relation to FIG. 9 above and FIG. 11 below.

At operation 1004, configuration of voting rights allocations are performed. The voting rights allocations are recorded in the blockchain. The number of voting rights allocated is based upon the number of shares owned by the shareholder and a vote ratio specified for that share type. The voting rights associated with a particular share is allocated to the end-investor who owns the share, or, to either a custodian or proxy, depending on the type of share ownership and/or proxy assignment. Voting rights allocation is described in further detail in relation to FIG. 9 above and FIG. 11 below.

At operation 1006, a meeting is created in the computer system. Creating the meeting also includes creating one or more agenda items. For each agenda item, the admin creates a unique voting token by defining a new asset identifier in its issuer node. The asset definition of the voting token contains all necessary details for a shareholder to vote for their desired option on the agenda item. An example asset definition is shown in FIG. 13.

At operation 1008, voting tokens for each agenda item can then be issued by the admin directly to shareholder wallets for direct shareholders and to custodian wallets in the case of indirect shareholders. Voting token allocations are recorded in the blockchain.

Voting tokens for each agenda item are issued as digital assets on the blockchain by the admin into shareholder wallets controlled by each shareholder. The asset definition for the voting token contains all necessary details for a shareholder to vote for their desired option on the agenda item. Each option on the agenda item is assigned a unique blockchain address controlled by the admin. When a shareholder votes, the voting tokens are sent to the address corresponding to their choice. At the end of the voting period, the admin tallies the votes by querying the balances of the addresses.

When it is time to distribute voting tokens, the admin completes two distinct processes. Since the shareholder digital wallets of the direct shareholders are known to the admin, the admin calculates the number of voting tokens for each agenda item that each direct shareholder should receive and provides (e.g., instructs its issuer node to issue) the voting tokens directly into the shareholder digital wallets. By way of example, if there are 5 agenda items and shareholder Bob owns 100 shares of company A, there can be 5 blockchain transactions from the admin to shareholder Bob (e.g., the blockchain transaction is signed by Bob's public key) that each include a different voting token (one for each meeting item). An example asset definition for a voting token is shown in FIG. 14.

Since the admin may not know the indirect shareholder distribution within a custodian, it may first request a distribution file from each custodian. In response, the custodian calculates the amount of shares that each indirect shareholder owns of its custodial holdings and returns a distribution file that instructs the admin on how to deliver the voting tokens directly to the shareholder digital wallets of the indirect shareholders. For example, if a custodian held 500 shares of a particular stock, which was indirectly owned by three shareholders, it would return a distribution file similar to that shown in FIG. 14. When the admin receives the distribution file from the custodian, it can proceed to issue the voting tokens into the shareholder digital wallets of the indirect shareholders.

At operation 1010, the meeting is started. In some embodiments, a registration process may be made available for participants to indicate their participation in a meeting before the meeting is started. The meeting may be started when the registered number of participants satisfies a quorum requirement (e.g., a predetermined or calculated minimum number of participants to validly start a meeting). Server computer system 902 provides for displaying a list of available voting tokens by issuer and/or meeting name, such that the shareholder/proxy can select one to vote on. Voting agendas and agenda items are displayed in list form and one at a time voting may be enabled.

In some embodiments, the shareholder or proxy can split the vote based upon the voting rights to vote differently for each voting right they currently have in their digital wallet. In some embodiments, for each voting right token a separate voting token may be made available. The voting may be performed individually for each voting token, for some number of voting tokens, or for all voting tokens, at a time.

If the voting period of a voting token is not active (i.e., the corresponding agenda item is not active), the voting info can be made visible but the voting buttons enabling voting remain disabled. The server computer system 402 can display notifications of start and end of the voting periods (e.g., for each agenda item) to the user devices.

The server computer system 402 may on the admin device, display a list of agenda items with start and stop control buttons to start or stop each voting period. Each agenda item may be independently controlled, with the capability to start/stop voting of any agenda item several times. The admin may also have the capability to recall distributed voting tokens and to permit voting again. For example, upon request, admin may transfer a vote already cast to a particular blockchain address back to the voter's digital wallet. The capability to recall all votes, only votes given before the meeting or only votes given during the meeting may be provided. Each recall and re-vote may be executed on the blockchain, and is therefore auditable.

At operation 1012, the voting is conducted. When a shareholder digital wallet receives one or more voting tokens, it reads the asset definition to display relevant data to the shareholder on the display of the user device, including the voting options. Once the shareholder selects their voting choice for the agenda item and confirms, the shareholder digital wallet creates and signs a blockchain transaction sending the appropriate number of voting tokens to the blockchain address for the selected choice. Continuing the example of shareholder Bob above, in order to cast his vote, Bob can generate blockchain transaction for each meeting item from him to the blockchain addresses setup to tally the votes (e.g., by signing the transaction with the public key of the wallet associated with the voting address) for each agenda item requiring a vote. The number of voting tokens may be all voting tokens for that agenda item or only some of them. The votes can be called back or changed before the meeting and/or voting for the agenda item is terminated. Calling back the votes during the meeting is possible only when specific voting round is active. The admin has the right to activate/deactivate the voting rounds any number of times during the meeting. The votes may be locked once the meeting has ended.

The server computer system 402 may provide the capability for a participant to display all active meetings that the participant has already voted on. The participant can select one and see agenda items they voted on and what the vote value was. Users can select one item and recall the vote. This returns the voting token back to the participant's digital wallet, and the participant is provided the capability to revote.

At operation 1014, the meeting is ended. The admin may notify each of the participants of the end of the meeting and end of all voting rounds. A message may be displayed on the screen of each user device.

At operation 1016, voting tokens are counted and the results are output. Once the deadline of the voting has passed, the admin queries the balances of each blockchain address for each agenda item in order to determine the distribution of votes. For example, software associated with the digital wallet associated with the blockchain address for each agenda item can tally the votes registered for each blockchain address.

At operation 1018, the meeting is closed and the results are recorded. The admin may display the voting results to one or more of the shareholders, proxies and/or custodians. In some embodiments, voting results of at least a predetermined number (e.g., five) of previous meetings where user voted in are displayed in the voting system in reverse chronological order. Final overall voting results can be displayed for each agenda item (e.g., registered vs voted votes, incl. for, against and abstain votes).

After operation 1018, process 1000 is terminated.

FIG. 11

Figure 11A:
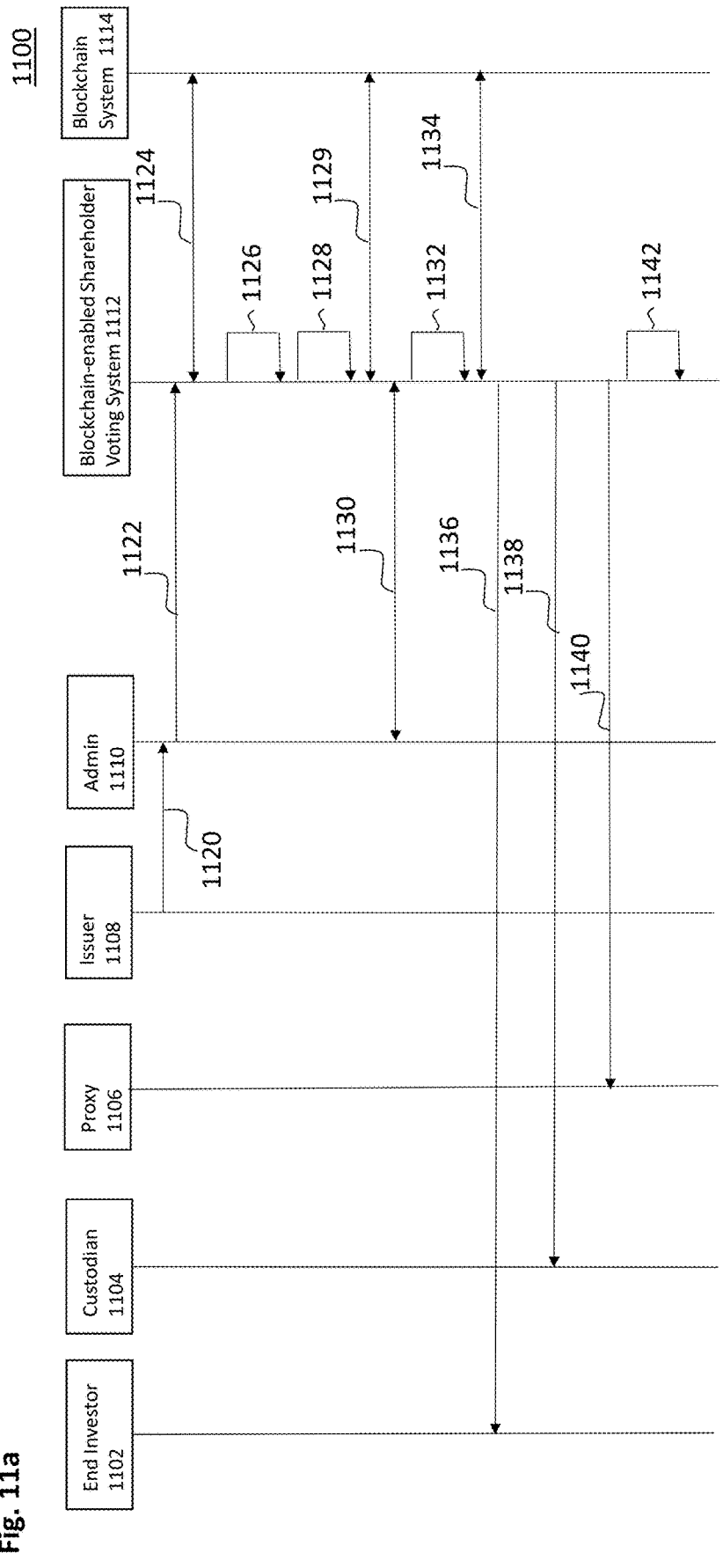
FIG. 11 (FIGS. 11a and 11b) illustrates a message interaction diagram showing a user (e.g., end user) assigning a proxy and voting, according to some embodiments.
Figure 11B:
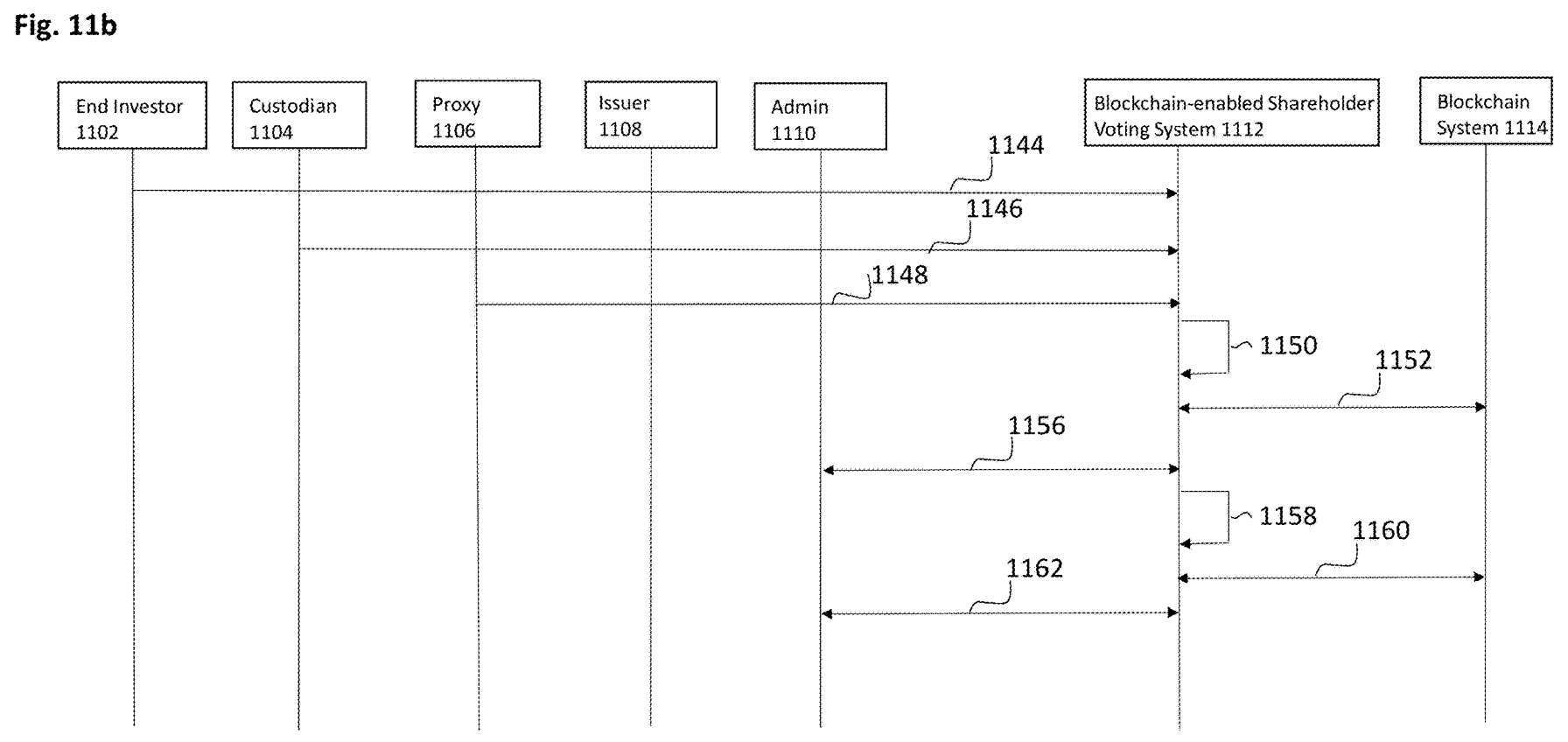

FIG. 11 (FIGS. 11a and 11b) illustrates a message interaction diagram 1100 showing a participant (e.g., end-investor) of the networked computing environment 400 assigning a proxy, and voting by proxy, according to some embodiments. In FIG. 11, end-investor 1102, custodian 1104, proxy 1106 and issuer 1108 may correspond to computers used/controlled by end-investor 914, custodian 918, proxy 916 and issuer 912, respectively, in FIG. 9. Admin 1110, blockchain-enabled voting system 1112 and blockchain system 1114 may correspond respectively to admin 910, server computer system 902 and blockchain system 908, and/or to admin 436, server computer system 402 and blockchain system 404.

Process 1100 maycommence when an issuer 1108 of a security A (e.g., shares of company A) requests admin 1110 (e.g., Nasdaq or other administrator of shareholder meetings) via a message 1120 to create a meeting. Admin 1110 requests the computer system 1112 (e.g., similar to server computer system 402) via a message 1122 to create the requested meeting.

Computer system 1112, upon receiving the request 1122 from admin 1110, retrieves the shareholding list from the blockchain system 1114. Operation 1124 includes a query from computer system 1112 requesting the shareholding list for security A specifying the corresponding blockchain address. The blockchain address corresponding to the shareholding list of security A may have been stored in the admin's wallet memory. As noted above, the admin's wallet memory or portions thereof can be stored in a memory of the computer system 1112 and/or in the admin 1110 access device. Operation 1124 mayalso include returning, from the blockchain system, the shareholding list for security A.

At operation 1126, the computer system 1112 determines the share allocation among shareholders. The share allocation can be determined based upon the corresponding shareholding list from the blockchain system. Share allocations are assigned to end-investors (e.g., direct shareholders) or custodians (e.g., indirect shareholders).

At operation 1128 the computer system 1112 determines the voting rights allocation. The right to vote is tied to share ownership. A voting right token gives the holder the right to vote on account of a particular shareholding. In some embodiments, each shareholder, either direct or indirect, is assigned a voting right token. In another embodiment, each shareholder, either direct or indirect, is assigned a number of voting right tokens determined according to a vote ratio per share determined for the type of security and the number of shares owned by the shareholder. Accordingly, a number of voting right tokens can be determined for a shareholder and that number of voting right tokens can be initially allocated to the digital wallet of that shareholder.

If the shareholder has assigned a proxy, the entirety of that shareholders voting right tokens for a particular asset can be transferred to the digital wallet of the proxy. Proxy assignments can be determined from configuration, from information received from an external source such as registry 934, or from the blockchain system. According to some embodiments, for example, each proxy assignment, along with an indication whether the proxy is delegable, is recorded in the blockchain (e.g., of the blockchain system 1114). The recording may be made by the admin or other entity after ensuring that a legally valid power of attorney document has been executed.

At operation 1129, the voting right tokens assignments are recorded in the blockchain. Each voting right token may be configured to be traceable to a particular share or particular group of shares. Colored coins, smart contracts or the like can be used to encode this traceability in the metadata of each transaction submitted to the blockchain system for recording voting right tokens. At the end of operation 1129, voting rights associated with the shareholdings listed in the shareholding list obtained at operation 1124 are assigned on the blockchain among end-investors, custodians and proxies.

Operation 1130 includes message exchanges between admin 1110 (and/or issuer) and computer system 1112, determining the agenda of the meeting and one or more agenda items for which votes are to be conducted.

At operation 1132, computer system 1112 determines the voting token distribution among the shareholders. The number of voting tokens to be allocated to a shareholder is determined based upon the number of shares and the vote ratio of that particular type of share. For example, a holding of 100 shared with a vote ratio of 2 will result in an allocation of 200 voting tokens that can be cast by that shareholder. Thus, initially, a number of voting tokens determined based upon the number of shares held and the vote ratio can be assigned to the digital wallets of respective shareholders. However, the voting tokens can be then transferred to the holders of the voting right tokens for the corresponding shares.

At operation 1134, computer system records the voting token distribution in the blockchain of the blockchain system 1114. Thus, at the end of the operation 1134, the voting tokens would be distributed (e.g., in accordance with the voting rights tokens and the number of shares information) on the blockchain among end-investors, custodians and proxies based on which entities hold the corresponding voting right tokens.

At operation 1136, the computer system 1112 updates the shareholder digital wallets with the voting token distribution as appropriate, and may optionally, notify each shareholder 1102.

At operation 1138, the computer system 1112 updates the digital wallets of custodians with the voting token distribution as appropriate, and may optionally, notify each custodian 1104.

At operation 1140, the computer system 1112 updates the proxy digital wallets with the voting token distribution as appropriate, and may optionally, notify each proxy 1140.

After the voting tokens have been distributed, at operation 1142, the meeting is started.

The shareholder 1102, custodian 1104 and proxy 1106 may vote using operations 1144, 1146 and 1148, respectively, to cast their voting tokens. As described above, casting the vote may include generating a transaction including a voting token, a source blockchain address corresponding to the voter's digital wallet and a destination blockchain address corresponding to the blockchain address for a selected voting option.

At operation 1150, the computer system 1112 processes the cast voting tokens, and at operation 1152 the voting tokens are recorded in the blockchain. In some embodiments, operations 1144, 1146 and 1148 may directly interact with blockchain system 1114.

At operation 1156, admin 1110 notifies that the meeting and/or the voting is completed. This determination may be made by the admin 1110 based on information received from blockchain-enabled shareholder voting system 1112.

At operation 1158, the meeting and/or the voting is ended.

The computer system 1112 retrieves, during operation 1160, the voting token information as cast by the shareholders, custodians and proxies from the blockchain.

At operation 1162, the result of the voting is displayed to the admin 1110. The displaying may involve admin 1110 receiving cast voting token information from blockchain-enabled shareholder voting system 1112 and generating the display, for example, in the browser of admin 1110, or the browser of admin 1112 receiving and rendering a display including the result as generated by blockchain-enabled shareholder voting system 1112.

The system may be able to generate a report that includes information about shareholders who registered to the meeting and voted and shareholders who registered but did not vote. The report may contain such information for each agenda item separately. The report may include information such as the following: Name of the investor, ID code/date of birth, Number of votes per each investor. In case a proxy was assigned, then the following information may additionally be included: Name of the proxy, ID code/date of birth of the proxy.

FIG. 12

Figure 12:
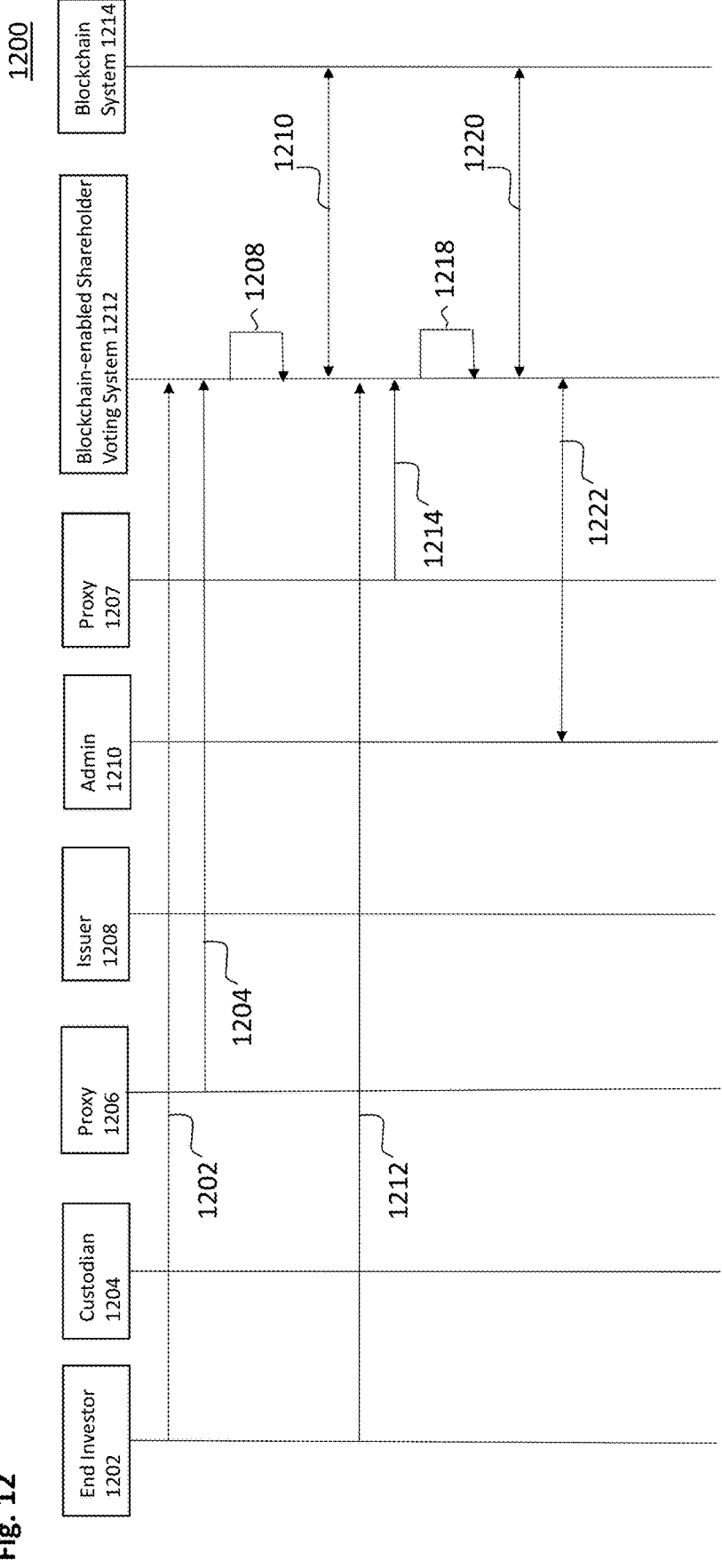
FIG. 12 shows a proxy re-assignment, according to some example embodiments.

FIG. 12 shows a proxy re-assignment, according to some example embodiments. In FIG. 12, end-investor 1202, custodian 1204, proxy 1206 and issuer 1208 may correspond to computers used/controlled by end-investor 914, custodian 918, proxy 916 and issuer 912, respectively, in FIG. 9. Admin 1210, blockchain-enabled voting system 1212 and blockchain 1214 may correspond respectively to admin 910, server computer system 902 and blockchain system 908, and/or to admin 436, server computer system 402 and blockchain system 404.

Shareholder 1202 and proxy 1206, at operations 1202 and 1204, respectively, notify computer system 1212 that proxy 1206 would act as proxy for shareholder 1202. One or both if the notifications may include a proxy agreement or other legally valid proxy document. In some embodiments, the proxy agreement may be accessed from another storage in response to receiving notifications 1222 and/or 1224.

At operation 1228, computer system 1208, processes the proxy assignment request. A request for assigning a proxy, i.e. delegating representation right outside the scope of a particular meeting, is a common occurrence in applications such as shareholder meetings. Some embodiments may require that the corresponding proxy exists (i.e., is registered and has an account) in the server computer system 402 system. If the recipient, i.e. proxy has not yet registered with system, an account is created for them using the identifying information specified in the proxy agreement. The proxy agreement may contain the following data: name of shareholder, ID of shareholder, name of proxy, ID code of proxy, proxy delegation right (e.g., yes or no), name of issuer whose securities are owned by the shareholder, type of proxy (e.g., for particular meeting(s) or time-based assignment), number of votes, proxy term, etc.

The proxy agreements and/or supporting documents (e.g. power of attorney, inheritance certificate, etc.) may be uploaded to a storage by a shareholder or other entity so that admin has access to such documents. Admin may include the functionality to approve or deny account a shareholder's proxy assignment request and/or account open request based, at least in part, upon the proxy agreements and/or supporting documents.

At operation 1230, the proxy assignment is recorded in the blockchain system 1214. Admin is provided with the capability to see all active proxies and trace the path of a proxy (in case it was delegated), for example, for surveillance purposes. Proxy assignment may be time-stamped. Additional information, such as, for example, reasons for assignment, can be recorded in metadata associated with the assignment recording.

Subsequently, at operation 1232, shareholder 1202 requests computer system 1212 to change proxy from proxy 1206 to proxy 1207. At operation 1234, proxy 1207 confirms acceptance of proxy. At operation 1238, the computer system 1212 processes the proxy change, and at operation 1240, records the change in the blockchain of blockchain system 1214. At operation 1242, admin 1210 is informed of the change in proxy. In another embodiment, this change of proxy may have been initiated by admin 1210.

The computer system 1212 provides the capability, for example, through an admin interface, to obtain an audit trail of proxy assignment for any proxy and/or shareholder. The audit trail identifies who gave the proxy to whom and if the proxy was assigned with a right to delegate or not. Each link in the proxy chain is traceable.

FIG. 13

FIG. 13 shows an example asset definition for a voting token, according to some example embodiments. The asset definition of the voting token contains all necessary details for a shareholder to vote for their desired option on the agenda item.

A description of the agenda item to be voted on, and the response choices are defined in the asset definition. A deadline for the voting is also provided in the asset definition.

FIG. 14

FIG. 14 shows an example distribution of voting tokens, according to some example embodiments. A custodian may provide a distribution file shown in FIG. 14 to an admin or computer system (e.g., server computer system 402) which may then distribute voting right tokens to that custodian's shareholders' digital wallets as specified in the distribution file. The distribution file specified a blockchain address and a number of shares or votes for each shareholder of a plurality of shareholders.

FIG. 15

FIG. 15 shows an example report of meeting participants, according to some example embodiments. The report indicates, per shareholder participant, the number of shares and the identity of any proxy assigned, if any. Server computer system 402 may for example, generate the report upon he request of the admin or other participant designated by the admin.

FIG. 16

FIG. 16 shows an example report 1600 of voting on an agenda item, according to some example embodiments. Report 1600 shows, per shareholder, the total number of votes and how the shareholder voted for each option of the agenda item. The report also shows how many votes were not voted.

According to the report 1600, proxy Jane Doe 3 voted all votes of shareholder Company ABC on agenda option 1; the 100000 votes of custodian shareholder Custodian DEF are split among the three voting options; and, proxy John Doe 4, acting on behalf of Custodian JKL, voted the shares of two shareholders for option 1 and the shares of another shareholder for option 2.

FIG. 17

FIG. 17 is a block diagram of an example computing device 1700 (which may also be referred to, for example, as a "computing device," "computer system," or "computing system") according to some embodiments. In some embodiments, the computing device 1700 includes one or more of the following: one or more processors 1702; one or more memory devices 1704; one or more network interface devices 1706; one or more display interfaces 1708; and one or more user input adapters 1710. Additionally, in some embodiments, the computing device 1700 is connected to or includes a display device 1712. As explained below, these elements (e.g., the processors 1702, memory devices 1704, network interface devices 1706, display interfaces 1708, user input adapters 1710, display device 1712) are hardware devices (for example, electronic circuits or combinations of circuits) that are configured to perform various different functions for the computing device 1700.

In some embodiments, each or any of the processors 1702 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 1702 uses an instruction set architecture such as x86 or Advanced RISC Machine (ARM).

In some embodiments, each or any of the memory devices 1704 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1702). Memory devices 1704 are examples of non-volatile computer-readable storage media.

In some embodiments, each or any of the network interface devices 1706 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 1708 is or includes one or more circuits that receive data from the processors 1702, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1712, which displays the image data. Alternatively or additionally, in some embodiments, each or any of the display interfaces 1708 is or includes, for example, a video card, video adapter, or graphics processing unit (GPU).

In some embodiments, each or any of the user input adapters 1710 is or includes one or more circuits that receive and process user input data from one or more user input devices (not shown in FIG. 17) that are included in, attached to, or otherwise in communication with the computing device 1700, and that output data based on the received input data to the processors 1702. Alternatively or additionally, in some embodiments each or any of the user input adapters 1710 is or includes, for example, a PS/2 interface, a USB interface, a touchscreen controller, or the like; and/or the user input adapters 1710 facilitates input from user input devices (not shown in FIG. 17) such as, for example, a keyboard, mouse, trackpad, touchscreen, etc.

In some embodiments, the display device 1712 may be a Liquid Crystal Display (LCD) display, Light Emitting Diode (LED) display, or other type of display device. In embodiments where the display device 1712 is a component of the computing device 1700 (e.g., the computing device and the display device are included in a unified housing), the display device 1712 may be a touchscreen display or non-touchscreen display. In embodiments where the display device 1712 is connected to the computing device 1700 (e.g., is external to the computing device 1700 and communicates with the computing device 1700 via a wire and/or via wireless communication technology), the display device 1712 is, for example, an external monitor, projector, television, display screen, etc.

In various embodiments, the computing device 1700 includes one, or two, or three, four, or more of each or any of the above-mentioned elements (e.g., the processors 1702, memory devices 1704, network interface devices 1706, display interfaces 1708, and user input adapters 1710). Alternatively or additionally, in some embodiments, the computing device 1700 includes one or more of: a processing system that includes the processors 1702; a memory or storage system that includes the memory devices 1704; and a network interface system that includes the network interface devices 1706.

The computing device 1700 may be arranged, in various embodiments, in many different ways. As just one example, the computing device 1700 may be arranged such that the processors 1702 include: a multi (or single)-core processor;

a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1700 may be arranged such that: the processors 1702 include two, three, four, five, or more multi-core processors; the network interface devices 1706 include a first network interface device that implements Ethernet and a second network interface device that implements WiFi and/or Bluetooth; and the memory devices 1704 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the server computer systems 102, 402 and 902, blockchain systems 104, 404 and 908, databases 108 and 408, admin devices 110, 410, and 910, user devices 112-114 and 412-414, etc., each of which is referred to individually for clarity as a "component" for the remainder of this paragraph, are implemented using an example of the computing device 1700 of FIG. 17. In such embodiments, the following applies for each component: (a) the elements of the 1700 computing device 1700 shown in FIG. 17 (i.e., the one or more processors 1702, one or more memory devices 1704, one or more network interface devices 1706, one or more display interfaces 1708, and one or more user input adapters 1710), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 1704 (e.g., in various embodiments, in a volatile memory device such as a RAM or an instruction register and/or in a non-volatile memory device such as a flash memory or hard disk) and all actions described herein as performed by the software modules are performed by the processors 1702 in conjunction with, as appropriate, the other elements in and/or connected to the computing device 1700 (i.e., the network interface devices 1706, display interfaces 1708, user input adapters 1710, and/or display device 1712); (c) alternatively or additionally, to the extent it is described herein that the component processes and/or otherwise handles data, in some embodiments, such data is stored in the memory devices 1704 (e.g., in some embodiments, in a volatile memory device such as a RAM and/or in a non-volatile memory device such as a flash memory or hard disk) and/or is processed/handled by the processors 1702 in conjunction, as appropriate, the other elements in and/or connected to the computing device 1700 (i.e., the network interface devices 1706, display interfaces 1708, user input adapters 1710, and/or display device 1712); (d) alternatively or additionally, in some embodiments, the memory devices 1702 store instructions that, when executed by the processors 1702, cause the processors 1702 to perform, in conjunction with, as appropriate, the other elements in and/or connected to the computing device 1700 (i.e., the memory devices 1704, network interface devices 1706, display interfaces 1708, user input adapters 1710, and/or display device 1712), each or any combination of actions described herein as performed by the component and/or by any software modules described herein as included within the component.

The hardware configurations shown in FIG. 17 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 17, (e) via other hardware arrangements, architectures, and configurations, and/or via combinations of the technology described in (a) through (e).

Technical Advantages of Described Subject Matter

In certain example embodiments, the performance and efficiency of computer systems that execute applications relying upon securities ownership information is improved. By using immutable distributed ledger technology (such as blockchain technology, which was originally designed for Bitcoin currency applications), for selected securities ownership based applications, systems and methods according to embodiments significantly reduce or eliminate the reliance on secondary proof of ownership and/or manual verification of ownership of assets.

The proof-of-work process performed by nodes of a blockchain computer system allow transactions to be cryptographically verified and become immutable. The immutability and integrity of transactions on the blockchain yields an increased reliability in the outputs provided by these embodiments. The immutability of transactions on the blockchain, which results, as described above, at least in part due to the nature of the underlying data structures and the high computing requirements for adding to the data structures, provides a substantially higher degree of reliability than currently available distributed ledger systems.

Increased system availability results because the blockchain is replicated at each node of the blockchain. Thus downtime due to inability to access underlying stored data is minimized. Moreover, unlike many distributed database systems, the blockchain and the above described implementations of embodiments yield completely trustworthy data for the entire blockchain even when one or more computing nodes of the blockchain system are unavailable.

Still further in some embodiments, because the blockchain can store information from different applications in the same blockchain, the required storage may be reduced when multiple applications utilizing the shareholder ownership information is stored on the same blockchain.

The verifiability and human readability of transaction chains associated with the blockchain is advantageous. Embodiments may maintain a header part of blocks in the blockchain in human readable form. Therefore, audit trails and the like for transactions can be generated efficiently without the need, or with a reduced need, for decoding or otherwise performing further processing during the generation of audit reports.

By having reliable ownership information embodiments can, or may interface with systems that can, that integrally electronically notify the true current owners of each asset/ security regarding various actions performed on or using the asset/security. Moreover, by providing an immutable plat- form for recording power of attorney documents and the like integrated with a platform for performing highly reliable voting operations, certain example embodiments provide an entirely technological solution by which shareholders can represent their shares remotely without having to be physi- cally present at shareholder meetings. The immutability of the ownership record, as provided in embodiments, reduces or eliminates the additional costs in computing and time conventional systems expend on providing a secondary level of reliability to their transactions.

The technical features described herein may thus improve the security, verifiability, reliability, efficiency, underlying data storage space, etc. when compared to conventional techniques.

Selected Terminology

Whenever it is described in this document that a given item is present in "some embodiments," "various embodi- ments," "certain embodiments," "certain example embodi- ments, "some example embodiments," "an exemplary embodiment," or whenever any other similar language is used, it should be understood that the given item is present in at least one embodiment, though is not necessarily present in all embodiments. Consistent with the foregoing, when- ever it is described in this document that an action "may" "can," or "could" be performed, that a feature, element, or component "may" "can," or "could" be included in or is applicable to a given context, that a given item "may" "can," or "could" possess a given attribute, or whenever any similar phrase involving the term "may" "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used to provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-read- able storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Whenever it is described herein that blockchain technol- ogy is used, it should be understood that in other embodi- ments other types of similar/analogous technology (e.g., other types of distributed ledger technology, cryptography technology, and/or proof of work technology) may alterna- tively or additionally, mutatis mutandis, be used.

Although process steps, algorithms or the like, including without limitation with reference to FIGS. 3 and 9-12, may be described or claimed in a particular sequential order, such processes may be configured to work in different orders. In other words, any sequence or order of steps that may be explicitly described or claimed in this document does not necessarily indicate a requirement that the steps be per- formed in that order; rather, the steps of processes described herein may be performed in any order possible. Further, some steps may be performed simultaneously (or in parallel) despite being described or implied as occurring non-simul- taneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any par- ticular embodiment or example. None of the above descrip- tion should be read as implying that any particular element, step, range, or function is essential. All structural and functional equivalents to the elements of the above-de- scribed embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, fea- ture, element, component, or step in this document is intended to be dedicated to the public.

The invention claimed is:

1. A networked computer system, comprising:

a distributed blockchain computer system including mul- tiple computing nodes, each computing node storing a copy, or a portion thereof, of a blockchain; and a server computer system communicatively coupled to one or more client computers and the distributed block- chain computer system, the server computer system comprising one or more processors configured to per- form operations comprising:

accessing, using at least one blockchain address stored in a digital wallet of a plurality of digital wallets stored in a memory of the server computer system, recorded ownership information of an asset, wherein the recorded ownership information comprises ownership information of respective groups of one or more units of the asset for each of a plurality of owners of the asset, and wherein the digital wallet is associated in the memory with the asset and stores an association between the at least one blockchain address and a private cryptographic key;

for each of the plurality of owners, distributing at least one voting token to a digital wallet of the owner in the plurality of digital wallets or a digital wallet of a proxy for the owner in the plurality of digital wallets, a number of votes to be distributed to each owner being in accordance with a respective number of units of assets identified in the recorded ownership information; and starting a voting event;

wherein the distributed blockchain computer system is configured to receive, during the voting event and at one or more of a plurality of blockchain addresses, respective ones of the voting tokens from the digital wallets of one or more of the owners or the digital wallets of one or more proxies of the owners; and wherein the one or more processors are further configured to perform operations comprising:

validating received voting tokens based upon a source blockchain address and a destination blockchain address associated with respective said received voting tokens;

determining, based upon numbers of the received voting tokens for each of the plurality of blockchain addresses, a distribution of votes for each of a plurality of voting choices; and outputting a result of the voting event based upon a determined distribution of votes.

2. The networked computer system according to claim 1, wherein the one or more processors are further configured to perform operations comprising:

distributing at least one voting rights token to a digital wallet of a first owner of the plurality of owners or a proxy of the first owner, wherein said distributing at least one voting token includes:

determining whether the digital wallet includes a voting rights token; and distributing the at least one voting token to the digital wallet if said determining determined that the digital wallet includes the voting rights token, and not distributing the at least one voting token to the digital wallet if said determining determined that the digital wallet does not include the voting rights tokens.

3. The networked computer system according to claim 2, wherein the one or more processors are further configured to perform operations comprising:

recording in the blockchain a proxy assignment from one of the owners to a first proxy, wherein the distributing said at least one voting rights token includes:

determining, by accessing the blockchain, whether said one of the owners has assigned a proxy to the first proxy; and distributing the at least one voting token to a digital wallet of the first proxy if said determining determined that the proxy has been assigned, and not distributing the at least one voting token to a digital wallet of said one of the owners if said determining determined that the proxy has not been assigned.

4. The networked computer system according to claim 3, wherein the one or more processors are further configured to perform operations comprising:

recording in the blockchain a second proxy assignment comprising assigning the proxy assignment to the first proxy to a second proxy, wherein the distributing said at least one voting rights token includes:

determining, from the blockchain, whether said one of the owners has assigned a proxy to the first proxy; and distributing the at least one voting token to a digital wallet of the second proxy if said determining determined that the proxy has been assigned, and not distributing the at least one voting token to a digital wallet of said one of the owners if said determining determined that the proxy has not been assigned.

5. The networked computer system according to claim 4, wherein the one or more processors are further configured to perform operations comprising:

obtaining information from the blockchain in relation to the proxy assignment;

generating an audit report indicating at least the first proxy and the second proxy; and displaying the generated audit report on one of the client computers.

6. The networked computer system according to claim 2, wherein the distributing at least one voting token to a digital wallet of each of the plurality of owners or their proxies comprises:

determining a number of units of the asset owned by one of said owners;

determining a number of votes based on the number of units of the asset; and distribute the determined number of votes to a digital wallet of the one of said owners.

7. The networked computer system according to claim 1, wherein recording the ownership information on the blockchain includes recording ownership information of a plurality said owners in a single transaction on the blockchain.

8. The networked computer system according to claim 1, wherein the one or more processors are further configured to perform operations comprising:

notifying, by the one or more processors, said owners of the starting of the voting event; and receiving electronic messages from said one or more client computers, wherein in response to one or more of the received electronic messages, the one or more processors transmit the voting tokens.

9. The networked computer system according to claim 2, wherein the one or more processors are further configured to perform operations comprising:

receiving a first electronic message, after said distributing at least one voting token;

in response to the received first electronic message, transferring one or more voting tokens from a first one of the plurality of blockchain addresses to a digital wallet of one of the owners; and subsequently, in response a second received electronic message, again transmitting the transferred one or more voting tokens from the digital wallet of said one of the owners to a second one of the plurality of blockchain addresses.

10. The networked computer system according to claim 9, wherein the one or more processors are further configured to perform operations comprising:

obtaining information from the blockchain in relation to the again transmitted one or more voting tokens;

generating an audit report indicating at least the transmitting to the first one of the blockchain addresses and the again transmitting to the second one of the blockchain addresses; and displaying the generated audit report on one of the client computers.

11. A method performed by one or more processors of a server computer system communicatively coupled to one or more client computers and a distributed blockchain computer system which includes multiple computing nodes with each computing node storing a copy or a portion thereof of a blockchain, the method comprising:

accessing, by the one or more processors using at least one blockchain address stored in a digital wallet of a plurality of digital wallets stored in a memory of the server computer system, recorded ownership information of an asset, wherein the recorded ownership information comprises ownership information of respective groups of one or more units of the asset for each of a plurality of owners of the asset, and wherein the digital wallet is associated in the memory with the asset and stores an association between the at least one blockchain address and a private cryptographic key;

for each of the plurality of owners, distributing, by the one or more processors, at least one voting token to a digital wallet of the owner in the plurality of digital wallets or a digital wallet of a proxy for the owner in the plurality of digital wallets, a number of votes to be distributed to each owner being in accordance with a respective number of units of assets identified in the recorded ownership information;

starting, by the one or more processors, a voting event, wherein the distributed blockchain computer system is configured to receive, during the voting event and at one or more of a plurality of blockchain addresses, respective ones of the voting tokens from the digital wallets of one or more of the owners or the digital wallets of one or more proxies of the owners;

validating received voting tokens based upon a source blockchain address and a destination blockchain address associated with respective said received voting tokens;

determining, based upon numbers of the received voting tokens for each of the plurality of blockchain addresses and by the one or more processors, a distribution of votes for each of a plurality of voting choices; and outputting, by the one or more processors, a result of the voting event based upon determined distribution of votes.

12. The method according to claim 11, further comprising:

distributing at least one voting rights token to a digital wallet of a first owner of the plurality of owners or a proxy of the first owner, wherein said distributing at least one voting token includes:

determining whether the digital wallet includes a voting rights token; and distributing the at least one voting token to the digital wallet if said determining determined that the digital wallet includes the voting rights token, and not distributing the at least one voting token to the digital wallet if said determining determined that the digital wallet does not include the voting rights tokens.

13. The method according toc claim 12, further comprising:

recording in the blockchain a proxy assignment from one of the owners to a first proxy, wherein the distributing said at least one voting rights token includes:

determining, by accessing the blockchain, whether said one of the owners has assigned a proxy to the first proxy; and distributing the at least one voting token to a digital wallet of the first proxy if said determining determined that the proxy has been assigned, and not distributing the at least one voting token to a digital wallet of said one of the owners if said determining determined that the proxy has not been assigned.

14. The method according to claim 13, further comprising:

recording in the blockchain a second proxy assignment comprising assigning the proxy assignment to the first proxy to a second proxy, wherein the distributing said at least one voting rights token includes:

determining, from the blockchain, whether said one of the owners has assigned a proxy to the first proxy;

distributing the at least one voting token to a digital wallet of the second proxy if said determining determined that the proxy has been assigned, and not distributing the at least one voting token to a digital wallet of said one of the owners if said determining determined that the proxy has not been assigned.

15. The method according to claim 14, further comprising:

obtaining information from the blockchain in relation to the proxy assignment;

generating an audit report indicating at least the first proxy and the second proxy; and displaying the generated audit report on one of the client computers.

16. The method according to claim 12, wherein the distributing at least one voting token to a digital wallet of each of the plurality of owners or their proxies comprises:

determining a number of units of the asset owned by one of said owners;

determining a number of votes based on the number of units of the asset; and distribute the determined number of votes to a digital wallet of the one of said owners.

17. The method according to claim 11, wherein recording the ownership information on the blockchain includes recording ownership information of a plurality said owners in a single transaction on the blockchain.

18. The method according to claim 11, further comprising:

notifying, by the one or more processors, said owners of the starting of the voting event; and receiving electronic messages from said one or more client computers, wherein in response to one or more of the received electronic messages, the one or more processors transmit the voting tokens.

19. The method according to claim 12, further comprising:

receiving a first electronic message, after said distributing at least one voting token;

in response to the received first electronic message, transferring one or more voting tokens from a first one of the plurality of blockchain addresses to a digital wallet of one of the owners; and subsequently, in response a second received electronic message, again transmitting the transferred one or more voting tokens from the digital wallet of said one of the owners to a second one of the plurality of blockchain addresses.

20. A non-transitory computer readable storage medium storing instructions, which when executed by one or more processors of a server computer system communicatively coupled to one or more client computers and a distributed blockchain computer system which includes multiple computing nodes with each computing node storing a copy or a portion thereof of a blockchain, causes the server computer system to perform operations comprising:

accessing, using at least one blockchain address stored in a digital wallet of a plurality of digital wallets stored in a memory of the server computer system, recorded ownership information of an asset, wherein the recorded ownership information comprises ownership information of respective groups of one or more units of the asset for each of a plurality of owners of the asset, and wherein the digital wallet is associated in the memory with the asset and stores an association between the at least one blockchain address and a private cryptographic key;

for each of the plurality of owners, distributing at least one voting token to a digital wallet of the owner in the plurality of digital wallets or a digital wallet of a proxy for the owner in the plurality of digital wallets, a number of votes to be distributed to each owner being in accordance with a respective number of units of assets identified in the recorded ownership information;

starting a voting event, wherein the distributed blockchain computer system is configured to receive, during the voting event and at one or more of a plurality of blockchain addresses, respective ones of the voting tokens from the digital wallets of one or more of the owners or the digital wallets of one or more proxies of the owners;

validating received voting tokens based upon a source blockchain address and a destination blockchain address associated with respective said received voting tokens;

determining, based upon numbers of the received voting tokens for each of the plurality of blockchain addresses, a distribution of votes for each of a plurality of voting choices; and outputting a result of the voting event based upon a determined distribution of votes.

\* \* \* \* \*